US011176374B2

(12) United States Patent
Brook et al.

(10) Patent No.: US 11,176,374 B2
(45) Date of Patent: Nov. 16, 2021

(54) DERIVING INFORMATION FROM IMAGES

(71) Applicant: Microsoft Technology Licensing, LLC, Redmond, WA (US)

(72) Inventors: Michelle Brook, Redmond, WA (US); William Guyman, Medina, WA (US); Szymon P. Stachniak, Redmond, WA (US); Hendrik M. Langerak, Bellevue, WA (US); Silvano Galliani, Zurich (CH); Marc Pollefeys, Zurich (CH)

(73) Assignee: Microsoft Technology Licensing, LLC, Redmond, WA (US)

( * ) Notice: Subject to any disclaimer, the term of this patent is extended or adjusted under 35 U.S.C. 154(b) by 266 days.

(21) Appl. No.: 16/400,815

(22) Filed: May 1, 2019

(65) Prior Publication Data
US 2020/0349351 A1 Nov. 5, 2020

(51) Int. Cl.
G06K 9/00 (2006.01)
G06T 7/55 (2017.01)
G06T 7/20 (2017.01)
G06T 17/20 (2006.01)

(52) U.S. Cl.
CPC ............ G06K 9/00671 (2013.01); G06T 7/20 (2013.01); G06T 7/55 (2017.01); G06T 17/20 (2013.01); G06T 2207/20221 (2013.01)

(58) Field of Classification Search
CPC ......... G06K 9/00671; G06T 7/55; G06T 7/20; G06T 17/20; G06T 2207/20221; G06T 19/20; G06T 2219/004; G06T 2219/2021; G06T 15/10; G06T 17/00
See application file for complete search history.

(56) References Cited

U.S. PATENT DOCUMENTS

| | | | |
|---|---|---|---|
| 9,171,403 B2* | 10/2015 | Shapira | G06K 9/00671 |
| 9,412,040 B2 | 8/2016 | Feng et al. | |
| 9,959,675 B2* | 5/2018 | Gal | G06F 30/00 |
| 10,572,970 B2* | 2/2020 | Sturm | H04N 5/2258 |
| 11,036,986 B2* | 6/2021 | Dubroy | G06F 16/29 |
| 2007/0052706 A1 | 3/2007 | Martin | |
| 2011/0069870 A1* | 3/2011 | Marais | G06T 7/75 382/106 |
| 2014/0368615 A1* | 12/2014 | van Baar | G01S 17/86 348/48 |
| 2015/0228114 A1 | 8/2015 | Shapira et al. | |
| 2016/0247290 A1* | 8/2016 | Liu | G06K 9/00791 |

(Continued)

OTHER PUBLICATIONS

Berlincioni, et al., "Semantic Road Layout Understanding by Generative Adversarial Inpainting", In The Repository of: arXiv:1805.11746, Nov. 20, 2018, 18 Pages.

Castellani, et al., "Improving Environment Modelling by Edge Occlusion Surface Completion", In Proceedings of the First International Symposium on 3D Data Processing Visualization and Transmission, Jun. 19, 2002, 4 Pages.

(Continued)

Primary Examiner — Xuemei G Chen
(74) Attorney, Agent, or Firm — Rainier Patents, P.S.

(57) ABSTRACT

The described implementations relate to images and depth information and generating useful information from the images and depth information. One example can identify planes in a semantically-labeled 3D voxel representation of a scene. The example can infer missing information by extending planes associated with structural elements of the scene. The example can also generate a watertight manifold representation of the scene at least in part from the inferred missing information.

20 Claims, 20 Drawing Sheets

(56) References Cited

U.S. PATENT DOCUMENTS

| | | | |
|---|---|---|---|
| 2016/0253842 A1* | 9/2016 | Shapira | G06F 3/017 345/633 |
| 2016/0350930 A1* | 12/2016 | Lin | G06K 9/66 |
| 2017/0148211 A1 | 5/2017 | Zakhor et al. | |
| 2017/0178388 A1* | 6/2017 | Bisson | G06T 17/00 |
| 2017/0185830 A1* | 6/2017 | Srivastava | G06K 9/00355 |
| 2017/0289535 A1* | 10/2017 | Crispin | G02B 27/017 |
| 2018/0181196 A1* | 6/2018 | Lee | H04N 5/225251 |
| 2018/0276895 A1* | 9/2018 | Hodge | G06T 11/00 |
| 2019/0043203 A1* | 2/2019 | Fleishman | G06N 3/04 |
| 2019/0096125 A1* | 3/2019 | Schulter | G05D 1/0088 |
| 2019/0147220 A1* | 5/2019 | McCormac | G06K 9/00208 382/103 |
| 2020/0018852 A1* | 1/2020 | Walls | G06K 9/00791 |
| 2020/0035011 A1* | 1/2020 | Bilgili | G06T 15/005 |
| 2020/0098135 A1* | 3/2020 | Ganjineh | G06F 16/583 |
| 2020/0184718 A1* | 6/2020 | Chiu | G06K 9/00671 |
| 2020/0191593 A1* | 6/2020 | Herman | G06K 9/00208 |
| 2020/0279387 A1* | 9/2020 | Zhang | G06K 9/6259 |
| 2020/0302681 A1* | 9/2020 | Totty | G06T 7/74 |
| 2020/0380711 A1* | 12/2020 | Luo | G06T 7/50 |

OTHER PUBLICATIONS

"International Search Report and Written Opinion Issued in PCT Application No. PCT/US20/023464", dated Jun. 17, 2020, 13 Pages.

Gerstweiler, et al., "Extraction of Structural and Semantic Data from 2D Floor Plans for Interactive and Immersive VR Real Estate Exploration", In Journal of Technologies, vol. 6, Issue 4, Nov. 4, 2018, pp. 1-27.

Turner, et al., "Floor plan generation and room labeling of indoor environments from laser range data", In Proceedings of International Conference on Computer Graphics Theory and Applications, Jan. 5, 2014, 12 Pages.

Xiong, et al., "Using Context, to Create Semantic 3D Models of Indoor Environments", In Proceedings of British Machine Vision Conference, Sep. 2010, 11 Pages.

Curless, et al., "A Volumetric Method for Building Complex Models from Range Images", In Proceedings of the 23rd Annual Conference on Computer Graphics and Interactive Techniques, 1996, pp. 303-312.

\* cited by examiner

Facility 100

Facility 100

FACILITY 100

FACILITY 100

DERIVING INFORMATION FROM IMAGES

BACKGROUND

Images and associated depth information can provide useful information in many scenarios, such as industrial settings, transportation, gaming, augmented reality, etc. In some cases, the images can entail depth images that contain the depth information. In other cases, depth information can be derived from other types of images (e.g., non-depth images), such as pairs of two-dimensional images. However, attempts to derive additional information from the images and depth information for other purposes, such as to recreate structures captured in the images have proven unsatisfactory. For instance, previous solutions required that every unit area of the structure be imaged. Any areas that were missing in the images and/or areas that were occluded in the images, such as by contents of a room (e.g., furniture) would create a void in the recreated structures.

BRIEF DESCRIPTION OF THE DRAWINGS

The accompanying drawings illustrate implementations of the concepts conveyed in the present patent. Features of the illustrated implementations can be more readily understood by reference to the following description taken in conjunction with the accompanying drawings. Like reference numbers in the various drawings are used wherever feasible to indicate like elements. Further, the left-most numeral of each reference number conveys the figure and associated discussion where the reference number is first introduced.

DETAILED DESCRIPTION

Figure 1A:
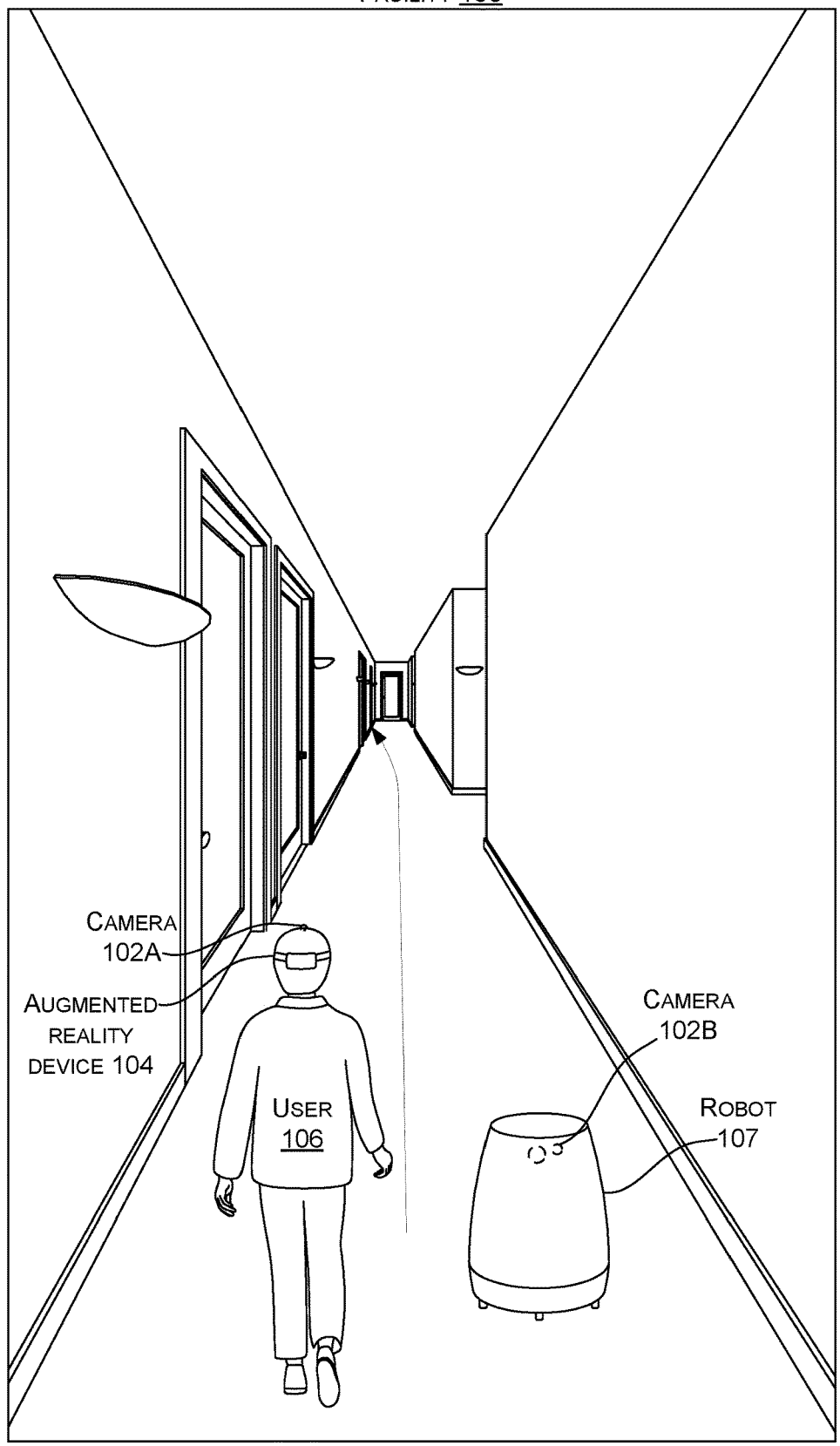
FIGS. 1A-1M and 2A-2E show example image scenarios in accordance with some implementations of the present concepts.

This discussion relates to cameras, and utilizing images from the cameras to provide information about a structure or facility. The information of the facility can be used for various purposes, such as to generate two-dimensional (2D) floor plans and/or a three-dimensional (3D) virtual wrapper or manifold of the structure of the facility. The virtual wrapper can be used for various application in the digital realm. For instance, a trajectory of a virtual object thrown at a wall of the facility could be determined from the virtual wrapper. However, in existing scenarios portions of the virtual wrapper tend to be missing or incomplete and instead of the ball bouncing off the wall, the ball might disappear into the wall. The present concepts can infer any missing information to make a complete or watertight virtual wrapper (e.g., an 'intelligent watertight wrapper' or 'intelligent watertight manifold'). Thus, any use of the floor plans in the physical realm and/or the virtual realm can be improved with the application of these concepts. These and other aspects are described below.

FIGS. 1A-1M collectively relate to an example facility 100. A camera 102 may be used to capture images of the facility. In this example, camera 102A (facing away from reader) is manifest as an element of a head mounted augmented reality device 104 worn by a user 106. Camera 102B is manifest as one of the sensors on a semi-autonomous facilities robot 107. Other camera manifestations are contemplated and additional examples are described relative to FIG. 6. Note that the location and orientation of the camera 102 can be tracked. For instance, the earth coordinate system location of the camera can be known. For example, the earth coordinate system location of the camera can be tracked via global navigation satellite system coordinates, such as global positioning system (GPS) coordinates (e.g., the camera is at this xyz location). Further, the orientation of the camera can be tracked. For example, micro-electro-mechanical sensors (MEMS) can track the orientation relative to six axes (e.g. the camera is facing in a specific horizontal direction and at a specific vertical direction).

Figure 3:
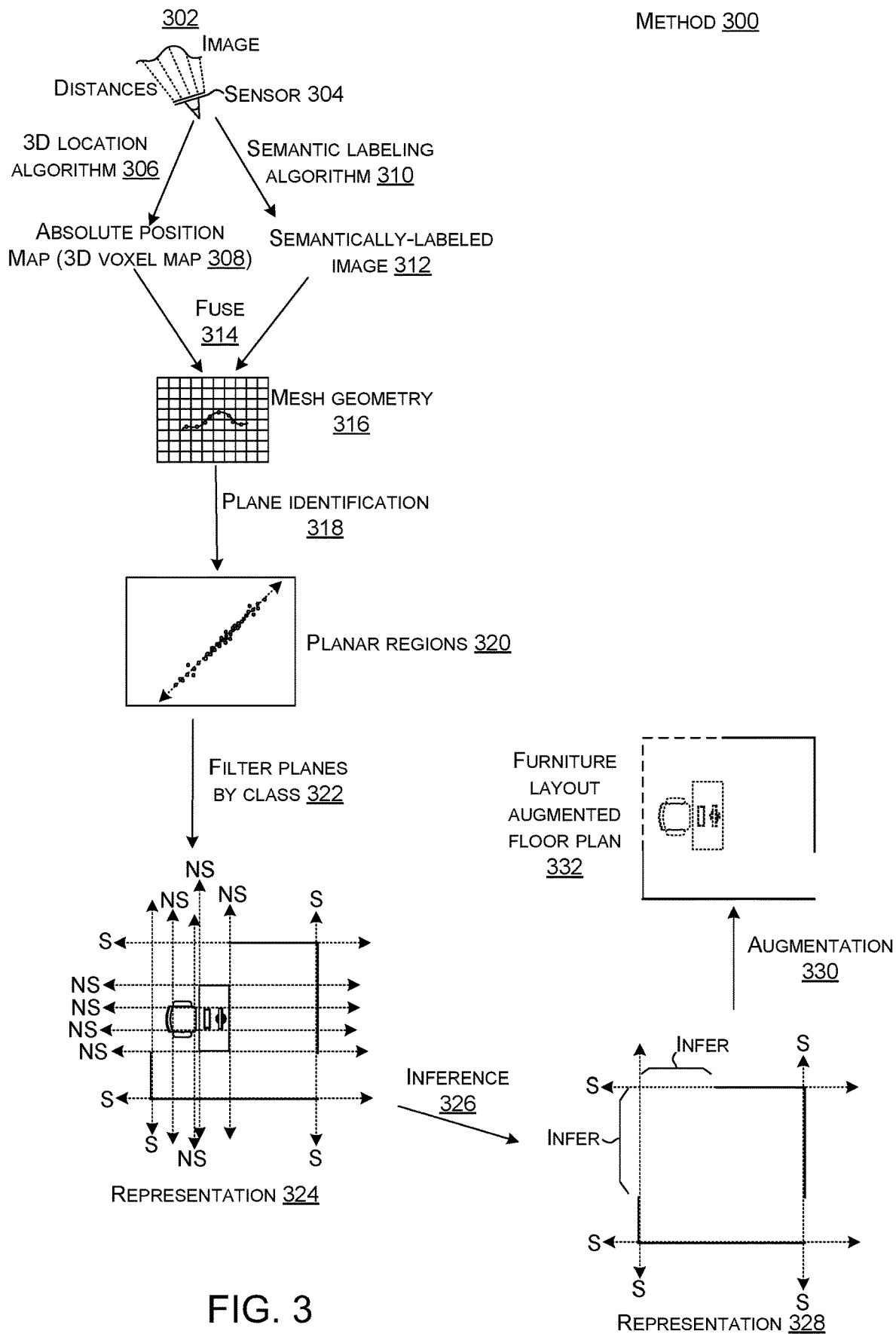
FIG. 3 shows an example depth image scene processing technique in accordance with some implementations of the present concepts.

The cameras 102 can capture images 108 of portions of the facility 100 and/or of scenes generally. (Note that for ease of explanation in introductory FIGS. 1A-1M the term 'image' is used broadly and can include 2D images, 3D images, visible light images and/or non-visible light images, among others. The discussion relative to FIG. 3, provides additional details and explanations about images and other elements, such as voxel maps and mesh geometries that can be derived from images). Some of these images 108 can include depth information (e.g., how far regions of the image are from the camera). Given that the location and orientation of the camera is known, the earth coordinate system location of the regions of the image can be determined.

Figure 1B:
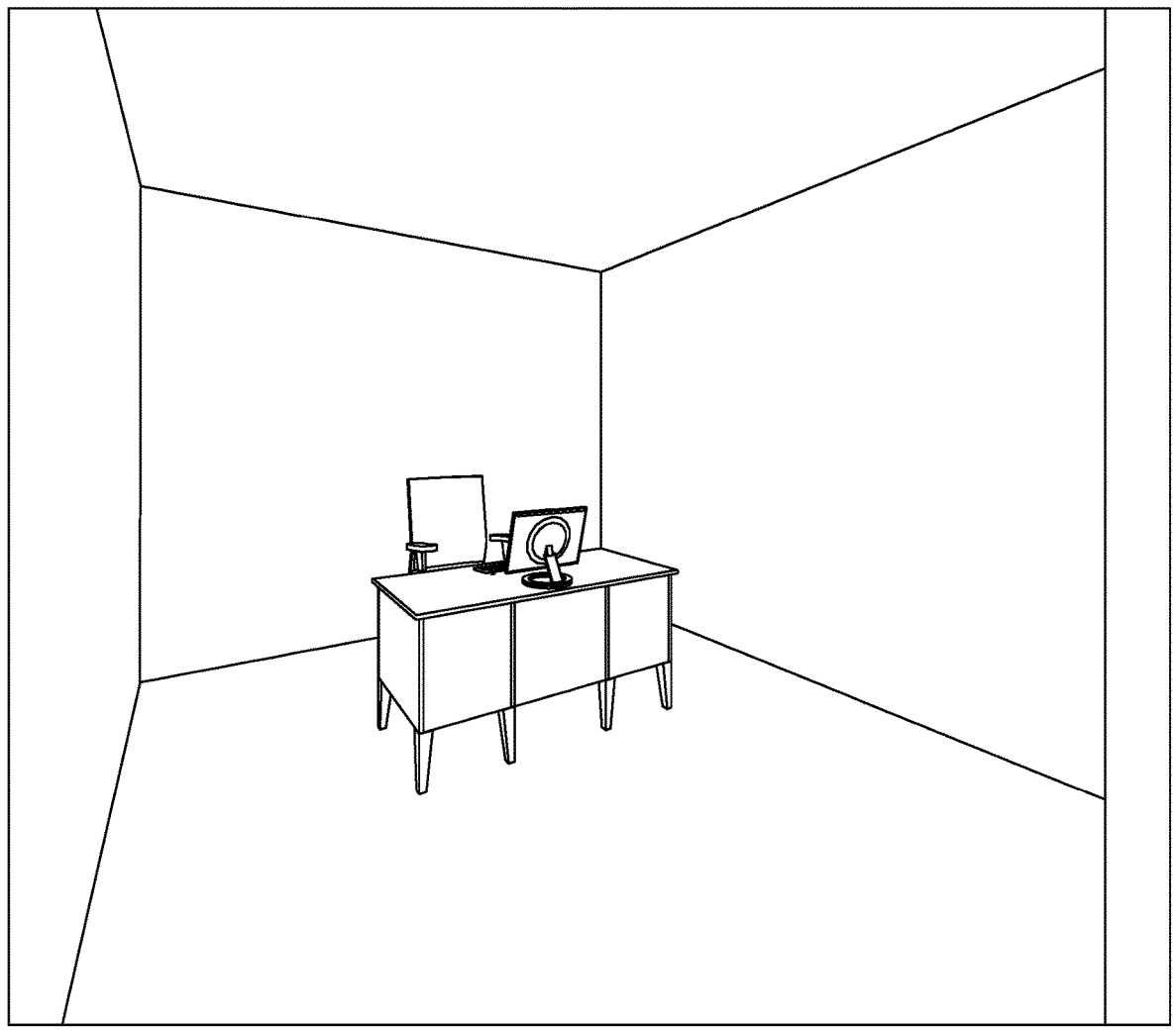
Figure 1C:
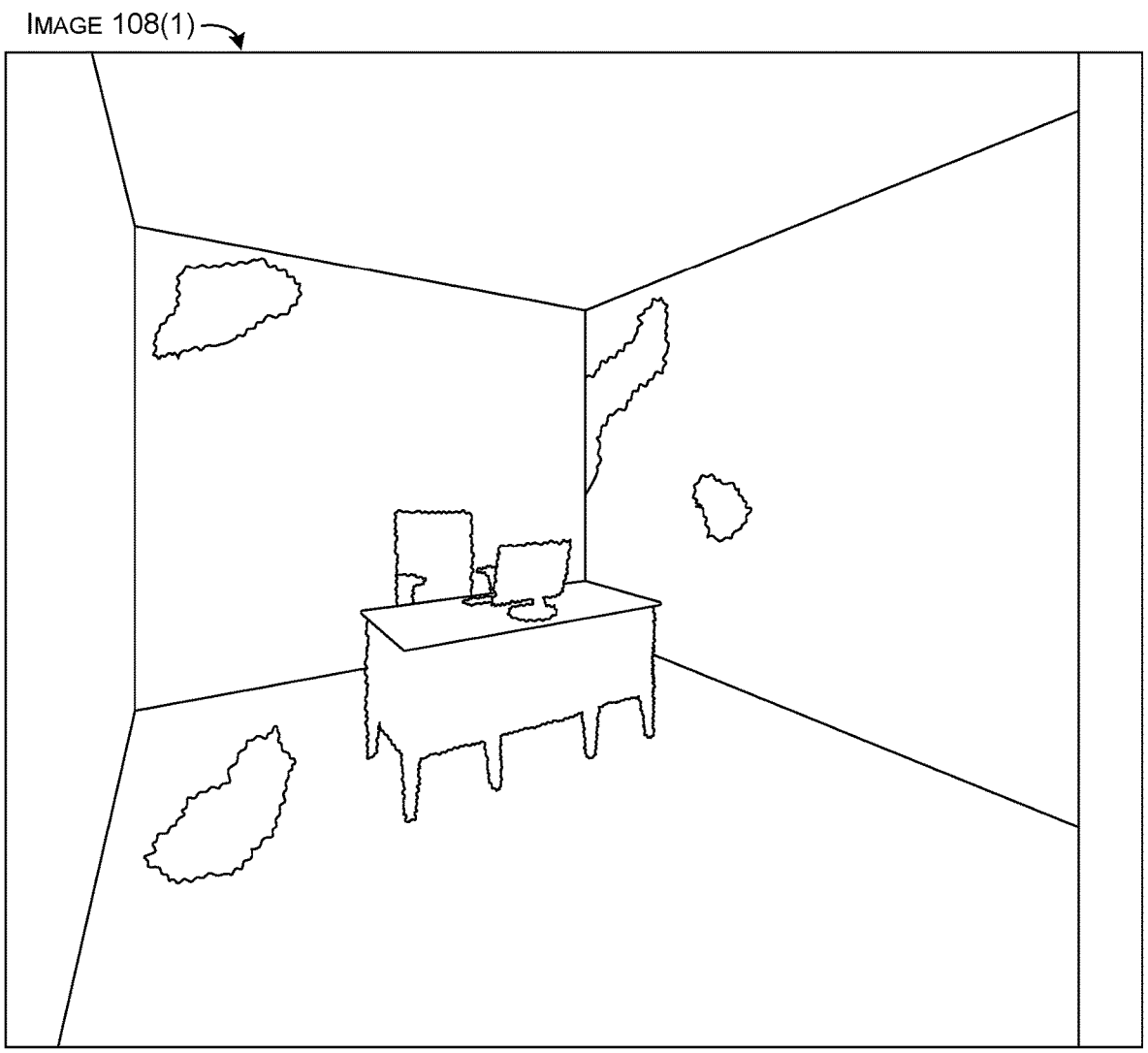

For purposes of explanation, FIG. 1A shows a hallway within the facility 100 and FIG. 1B shows an office that is connected to the hallway by a doorway. These details are provided for purposes of explanation. The present concepts can be applied to any type of facility. FIG. 1C is an example of an image 108(1), such as a depth image that could be captured of the office by the camera 104(1) as worn by the user or by camera 104(2) on the robot 107, among others. Note that there are techniques for generating depth information from non-depth images, such as 2D images. For instance, depth image can be generated from pairs of 2D images. Thus, depth information can be available without traditional depth images.

Figure 1D:
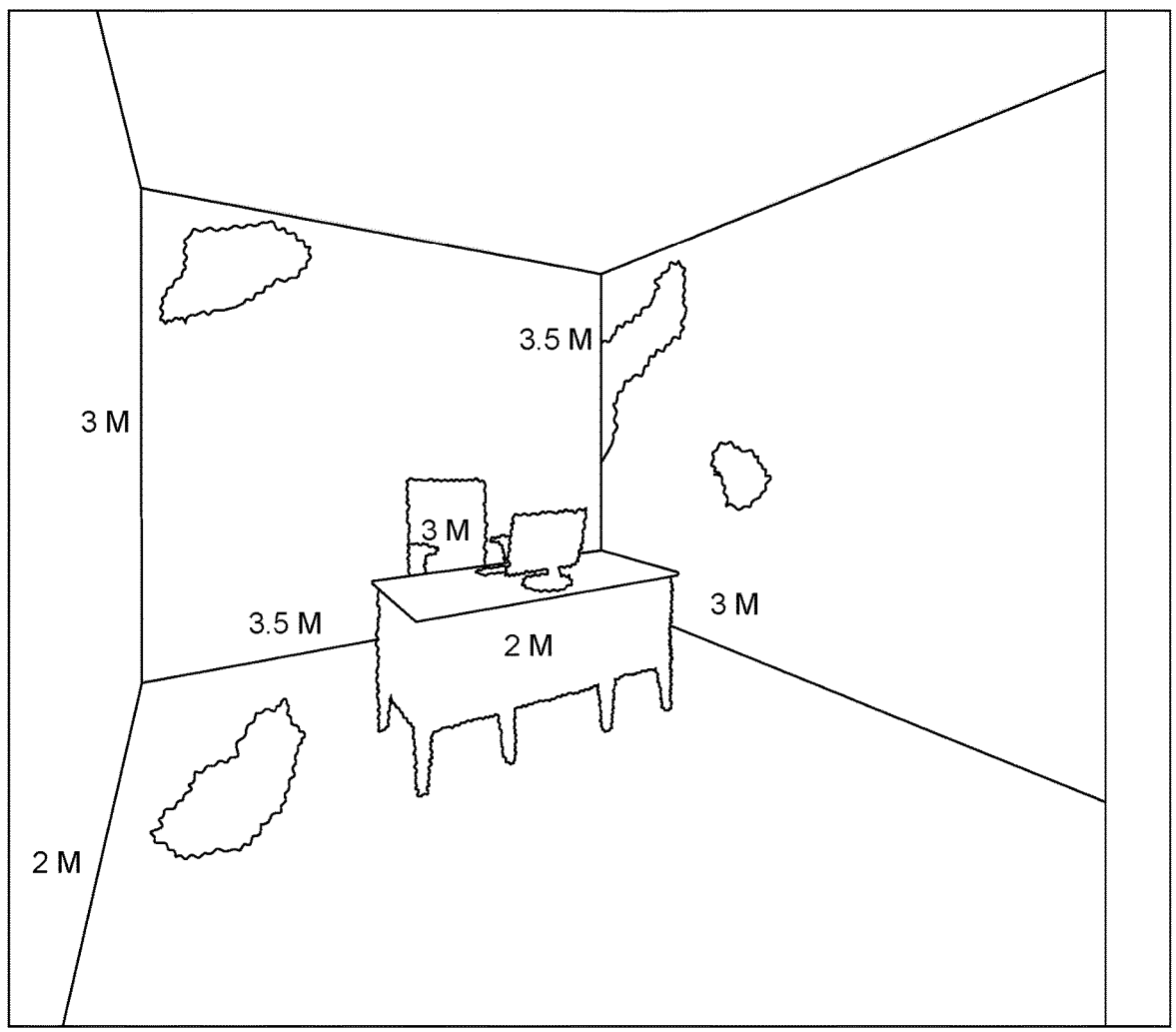

FIG. 1D shows a representation of an image 108(2) of the office that includes depth values from the camera to items or objects of the office. (Note that the representation is somewhat simplified to accommodate the limitations of line drawings). Image 108(2) can be viewed as a depth image that shows a scene and indicates distances to items in the scene, such as on a pixel-by-pixel basis, a per region basis, and/or a per object basis. In this case, distances between the camera and the objects are shown in meters (M). Recall that the location and orientation of the camera can be known in earth coordinate system coordinates. Given this earth coordinate system location and orientation of the camera, the relative distances to items in the scene can be converted to earth coordinate system locations for those items.

Figure 1E:
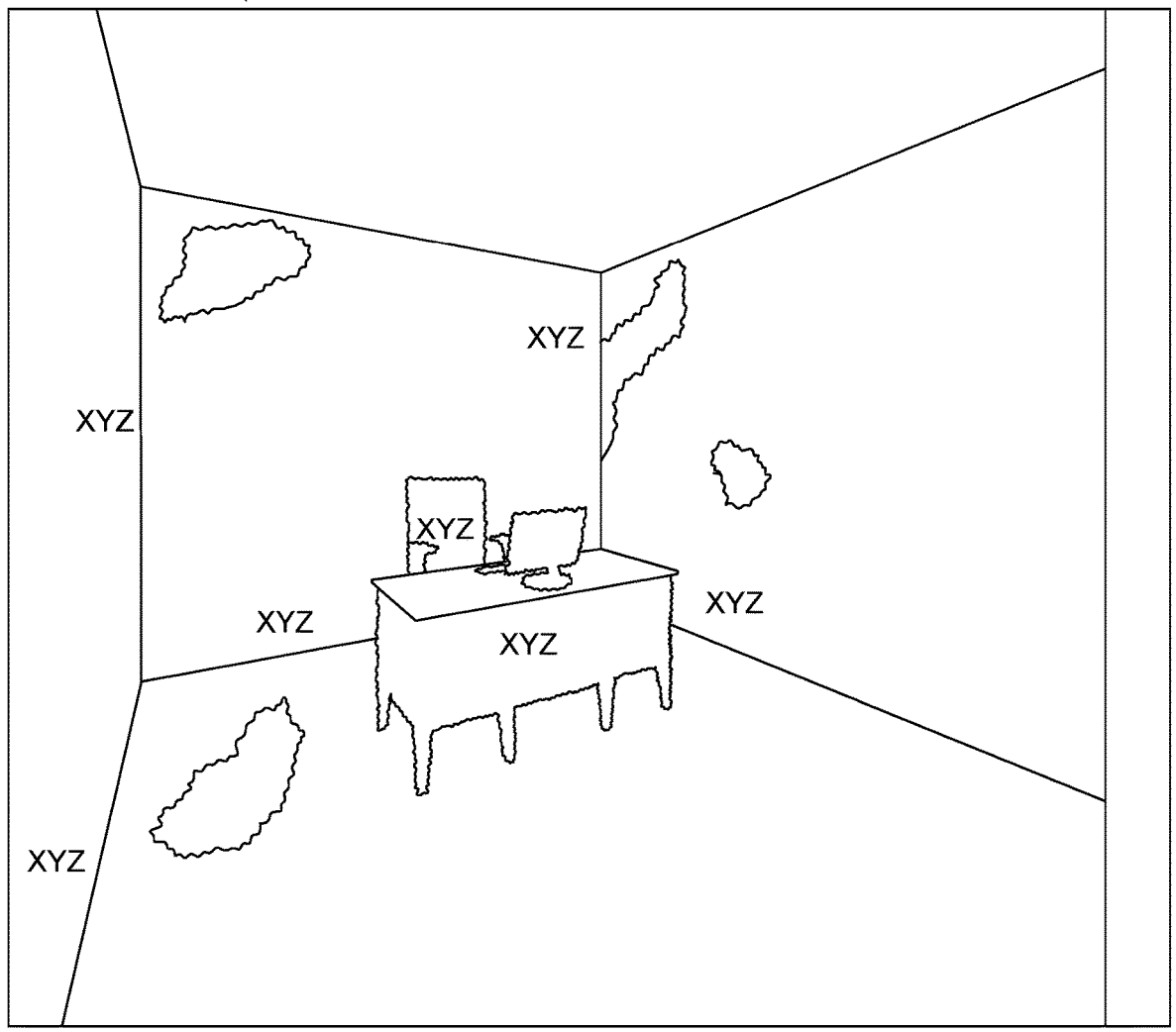

FIG. 1E shows another image 108(3) where the relative distances are replaced by absolute locations represented as earth coordinate system (e.g., x, y, and z coordinates). (Actual coordinates are not provided for sake of brevity and ease of explanation).

Figure 1F:
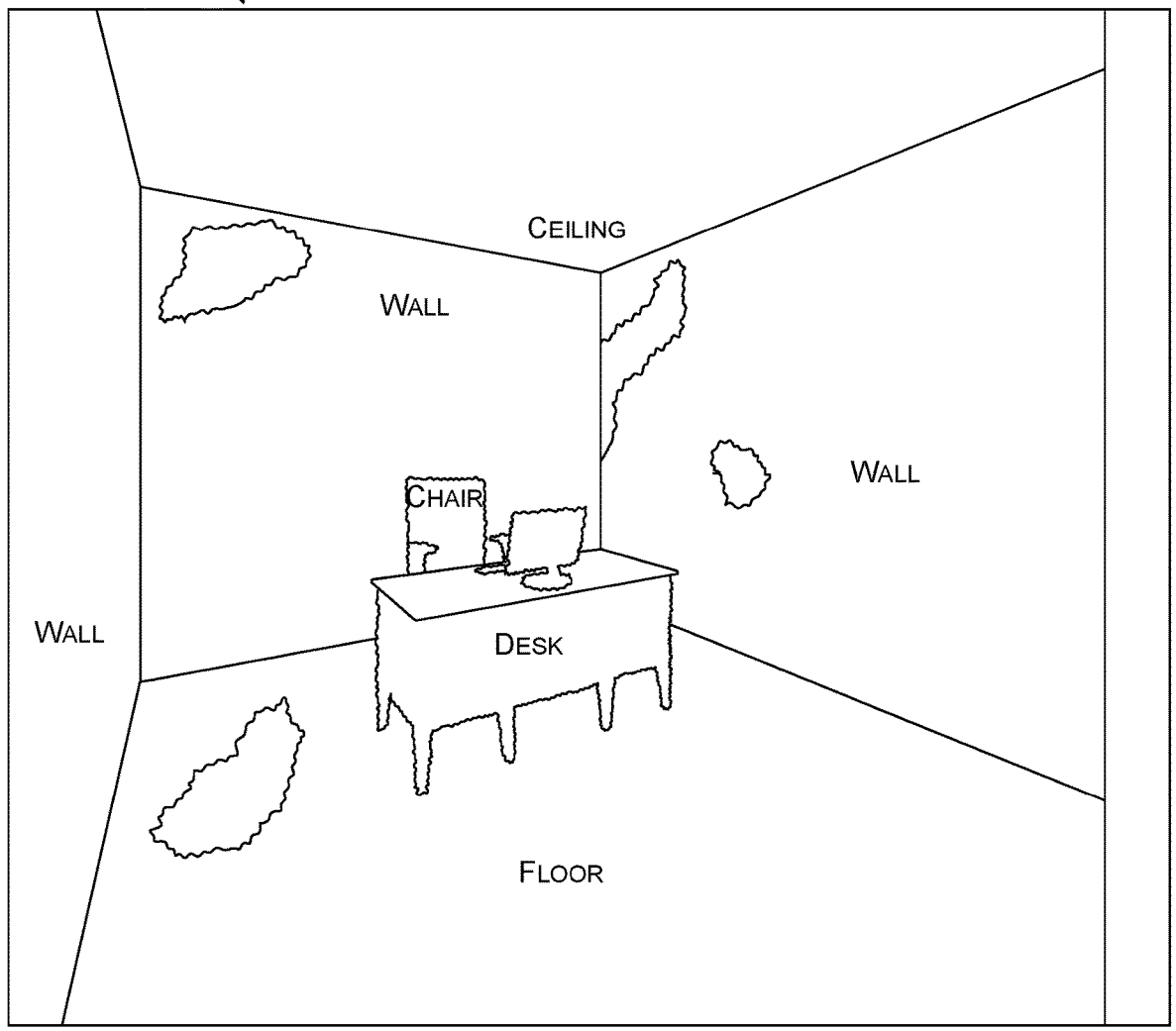

FIG. 1F shows another image 108(4). In this case, objects in the image are semantically labeled (e.g., tagged with names).

Figure 1G:
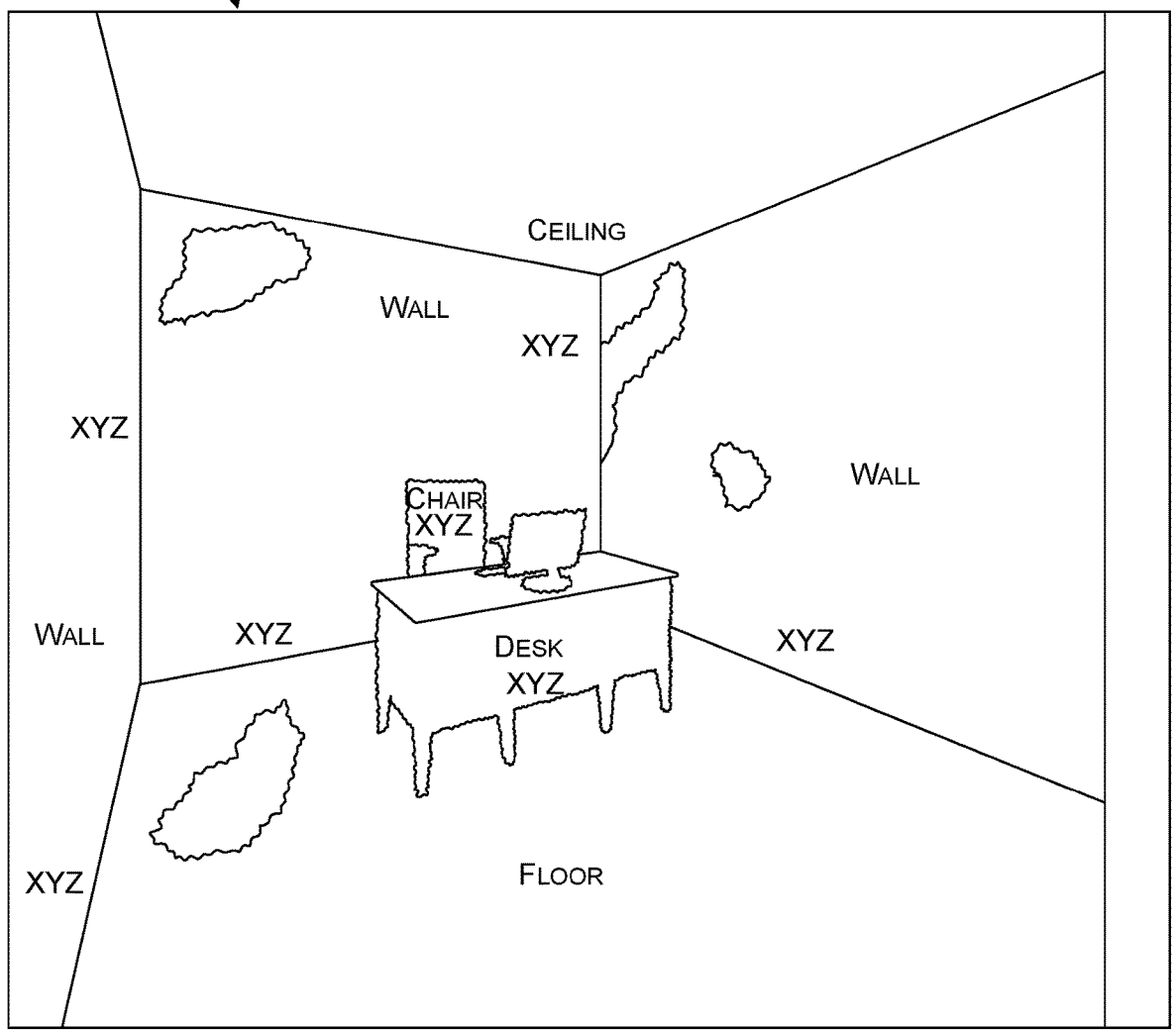

FIG. 1G shows another image 108(5) that fuses the depth information of FIG. 1E and the semantic labels of FIG. 1F into a single depth image.

Figure 1H:
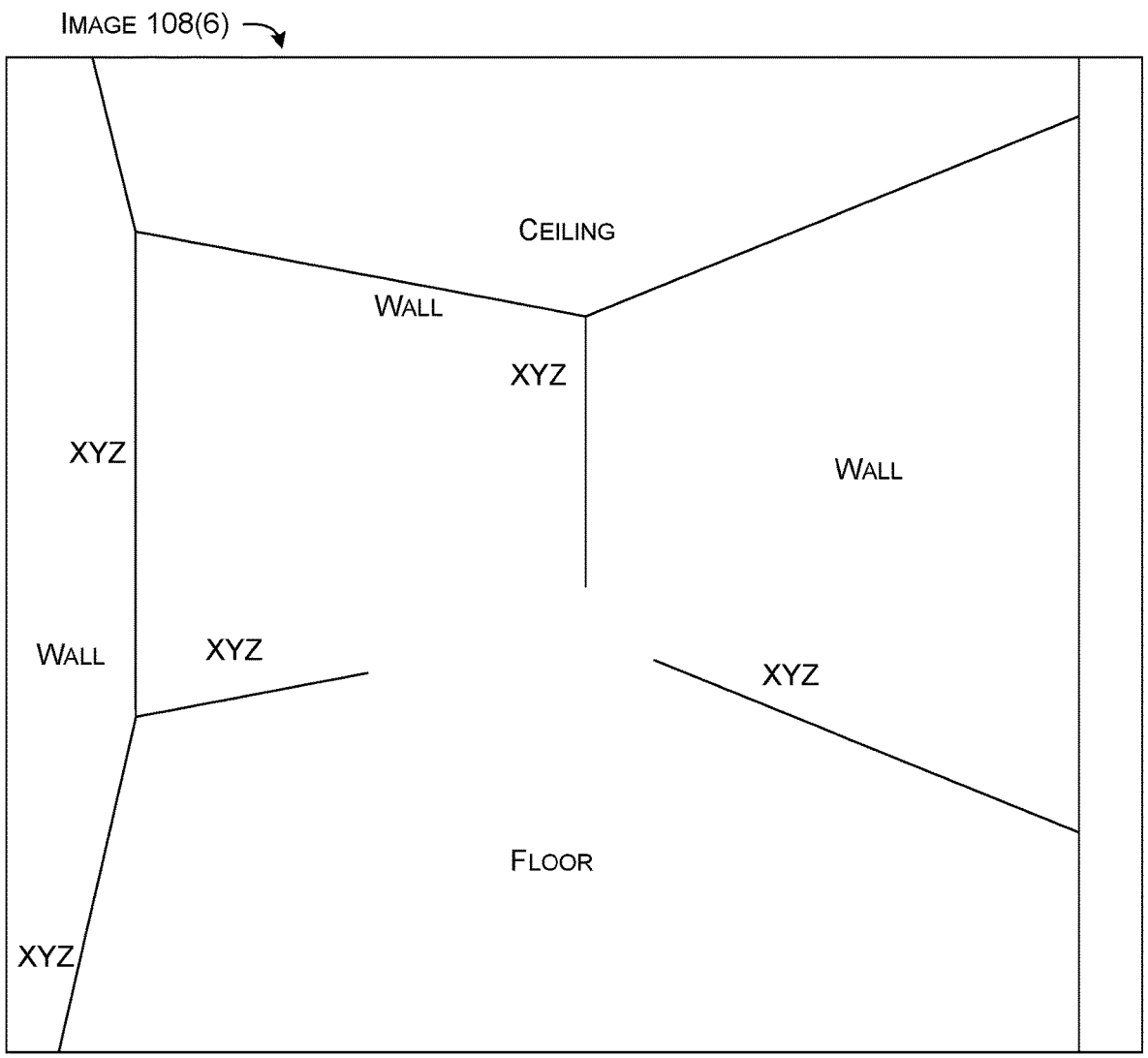

FIG. 1H shows a further image 108(6) where all non-structural items have been removed. In this example, items or objects can be filtered by semantic label. For instance, a subset of words can be established that is associated with structural elements, such as floor, wall, and/or ceiling, among others. All other words and the items/objects they are tagged to can be removed from the image. The subsets of words to be retained and/or excluded can be customized as desired.

Figure 1I:
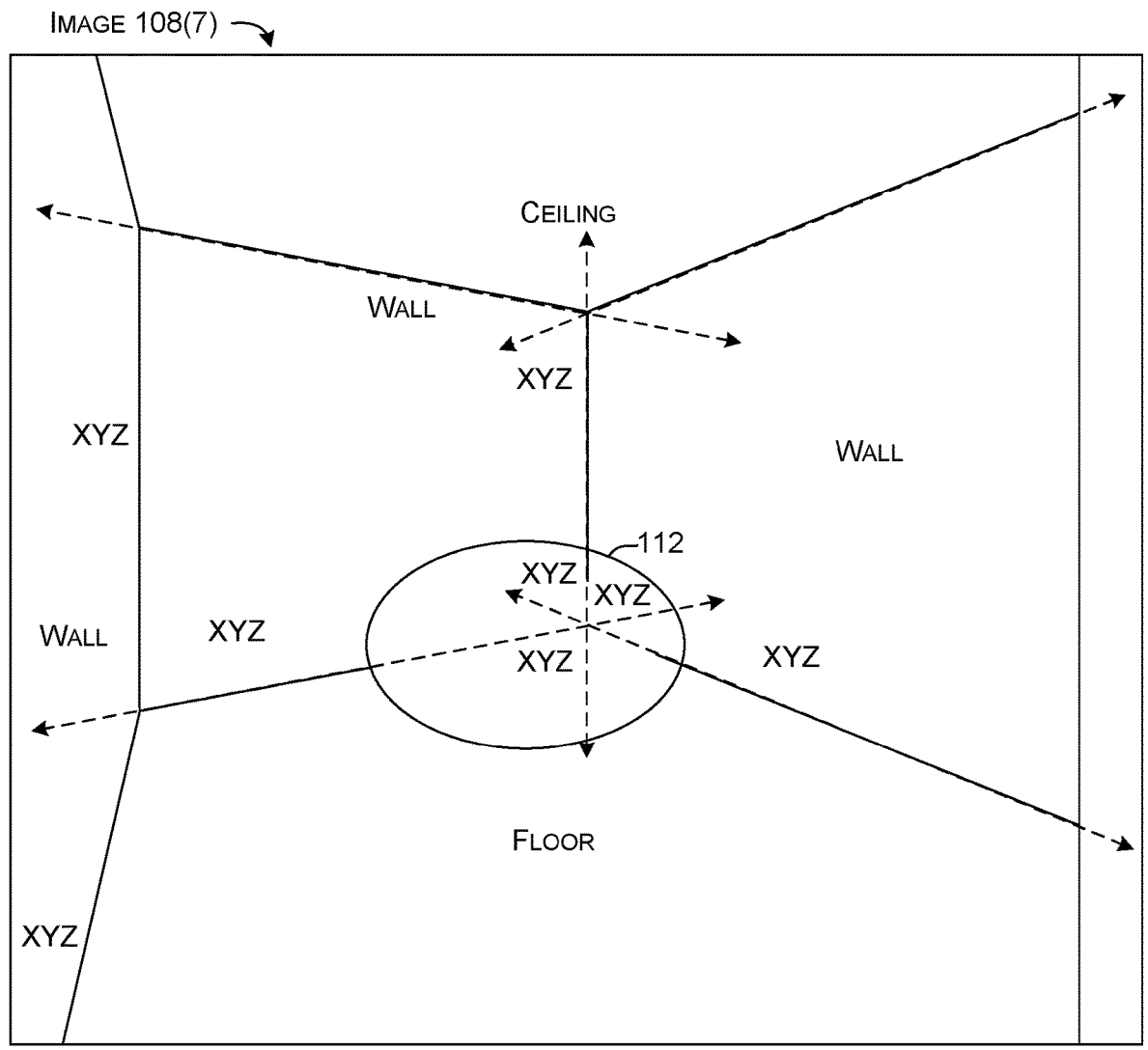

FIG. 1I shows planes extended to complete areas that were occluded by removed items in image 108(7). Intersection of these planes can indicate edges and/or corners. Distance values can be inferred for the missing areas based upon the known distance values. For example, as indicated generally at 112 distance values for the missing wall and floor values can be inferred from the adjacent distance values. Thus, FIG. 1I shows how information can be inferred for areas that were occluded during imaging (e.g., a non-structural object blocked the area in the image) and/or for areas between images (e.g., where adjacent images of a scene did not overlap).

Figure 1J:
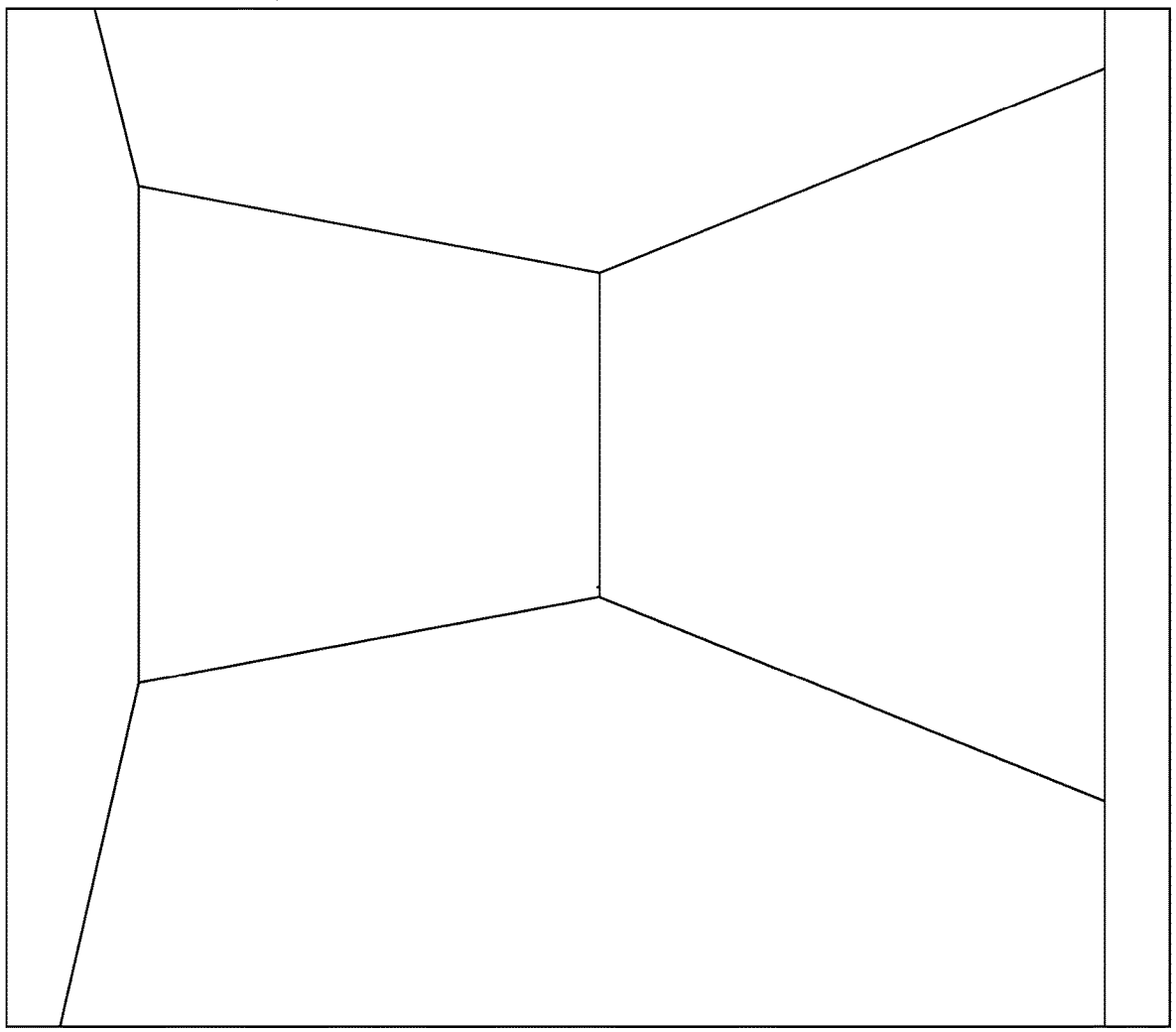
Figure 1K:
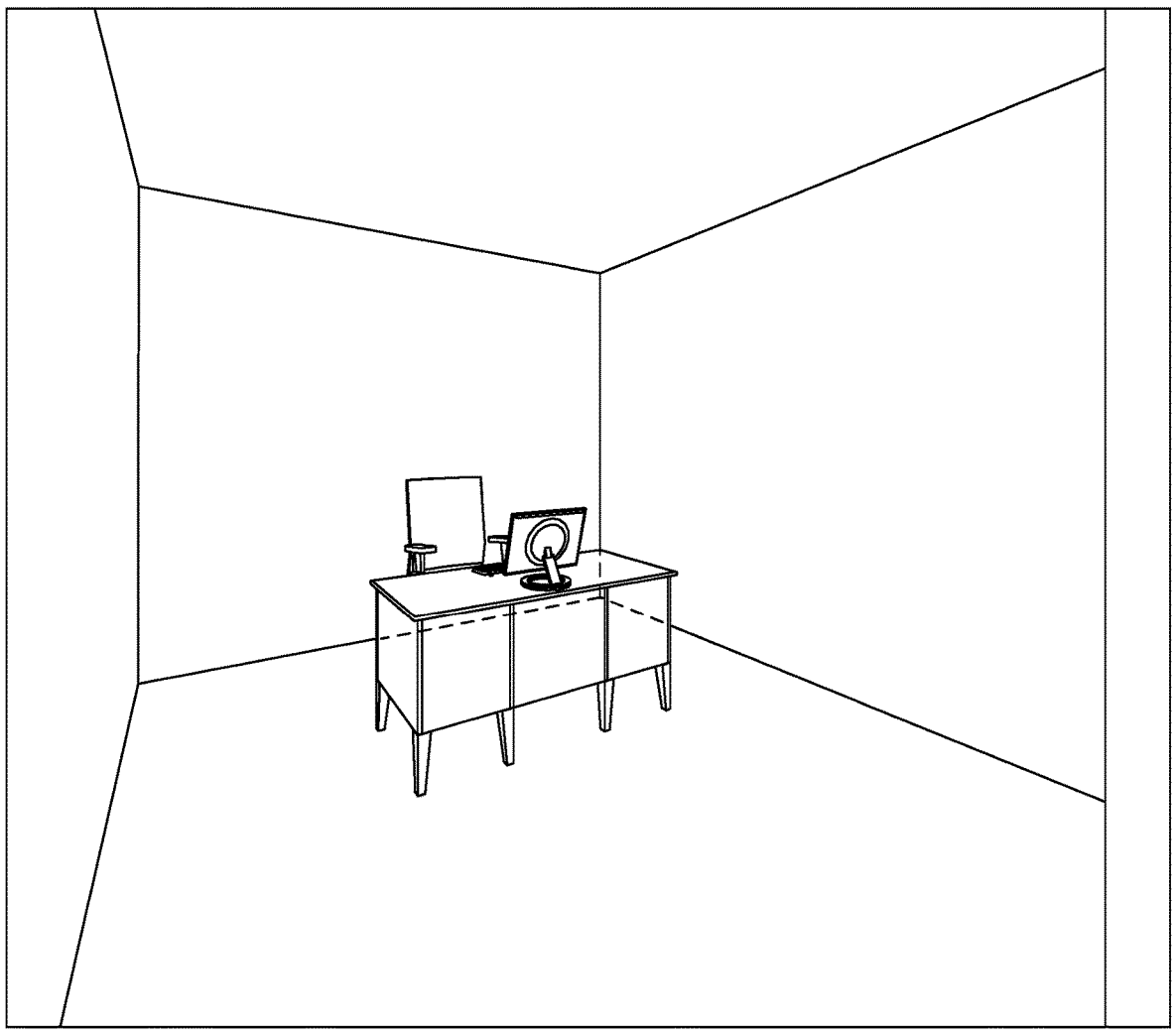

FIG. 1J shows a completed image 108(8) of the structure of the office and can be compared to the incomplete image of FIG. 1G. Image 108(8) can be viewed as a depth image. This depth image can be used for various purposes, such as creating blueprints or structural plans of the facility. Another example use is described below relative to FIGS. 1K-1M.

FIG. 1K again shows an image 108(9) of the office where depths behind the desk that were inferred as described above are shown in ghost, but would not be visible to the user. These depth values are available for various purposes, and may be obtained by various applications, such as through application program interfaces (APIs).

Figure 1L:
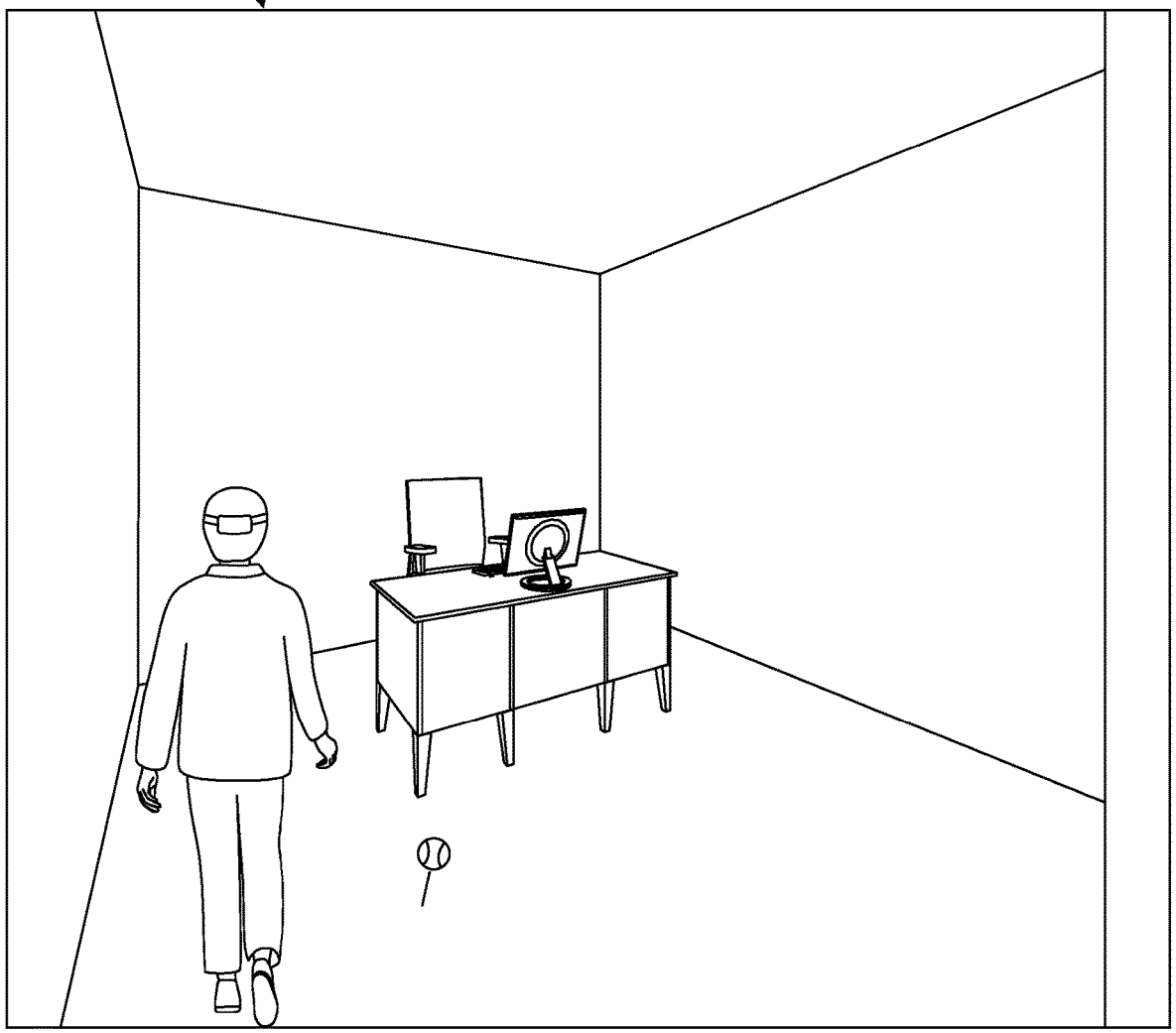

FIG. 1L shows an image 108(10) of the office from (approximately) the perspective of the user wearing the camera (as a component of an augmented reality headset). In this case, the user sees a virtual ball rolling toward the desk. The virtual ball is visible to the user and represents a virtual object augmented into the physical office by the augmented reality headset.

Figure 1M:
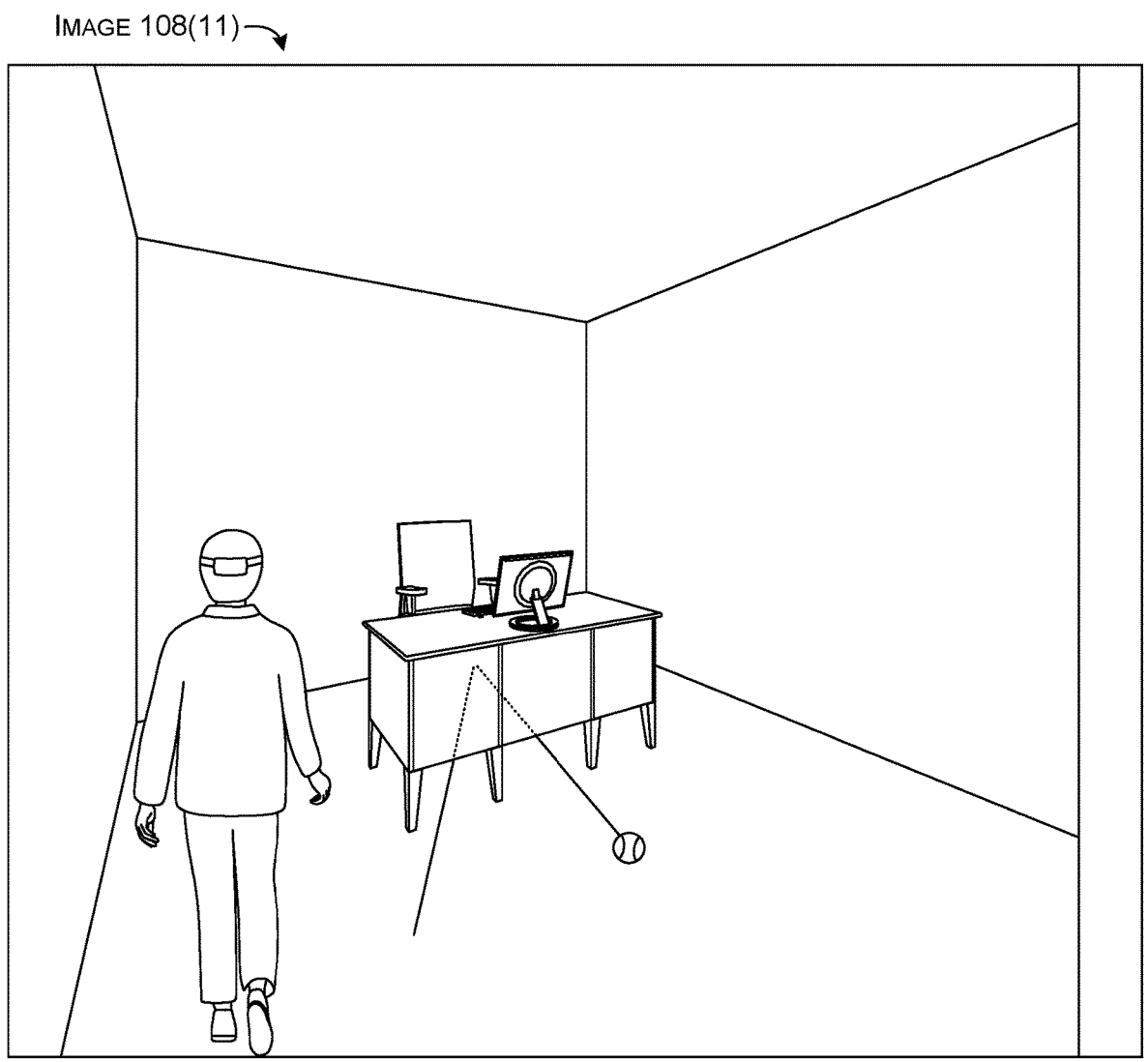

FIG. 1M shows image 108(11) that includes the virtual ball after it rolled under the desk, bounced off of the wall and rolled back out. The areas of the ball's path shown in ghost would not be visible to the user, but affect the location where the ball reappears, the ball's direction of movement, and/or the amount of time the ball is hidden from view. This 'realistic' representation is possible because the inferred depth values allow the proper path of the ball to be calculated and displayed by the augmented reality headset. As mentioned above, this is but one example of how information can be inferred to complete a virtual representation of the facility's structure and how the virtual representation can be utilized for various purposes.

FIGS. 2A-2E build upon the aspects described above. Further, FIGS. 2A-2E collectively show how performing the mapping on adjacent areas (e.g., offices) can provide further details about the facility. These further details can be used for various purposes such as to complete floorplans (e.g., blueprints) of the facility. Note that for ease of illustration, FIGS. 2A-2E relate to the rectangular office configuration introduced above relative to FIG. 1B. However, the present concepts can readily be applied to other structural configurations, such as walls that intersect at non-orthogonal angles (e.g., a trapezoidal room), curved walls (approximated by multiple planes), and/or angled ceilings (e.g., cathedral ceilings or vaulted ceilings), among others.

Figure 2A:
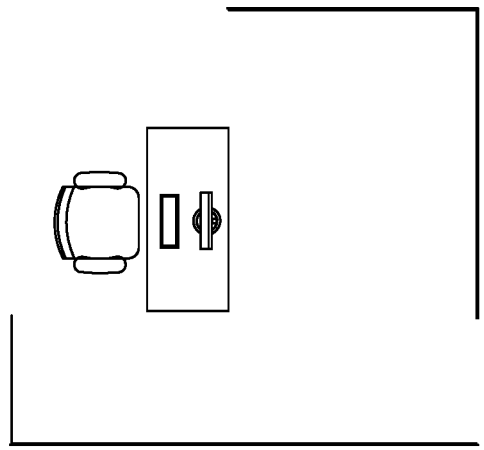

FIG. 2A shows a 2D representation of the facility 100 and the office looking down from above. This 2D representation can be generated from the depth images, such as those generated above relative to FIGS. 1D-1G, among others.

Figure 2B:
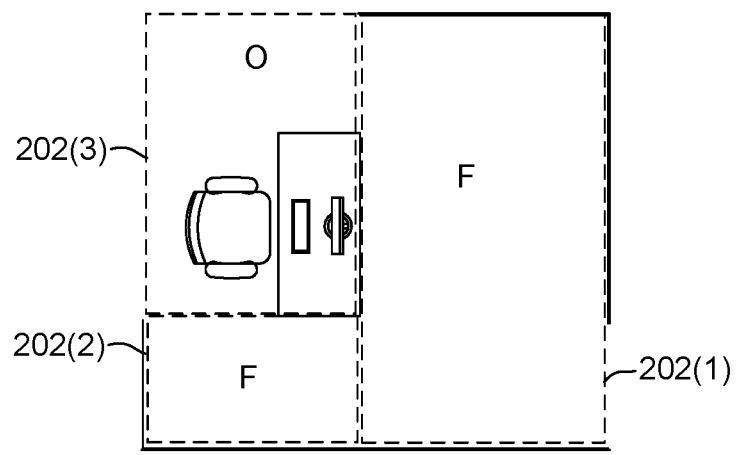

FIG. 2B shows a form of segmentation being applied to the office. The segmentation is represented as rectangles 202 shown in ghost. Segmentation is described in more detail below relative to FIG. 3. Briefly, segmentation can be based upon various parameters, such as the presence of planar surfaces. The planar surfaces can be extended and intersecting planar surfaces can be used to define a segment.

Figure 2C:
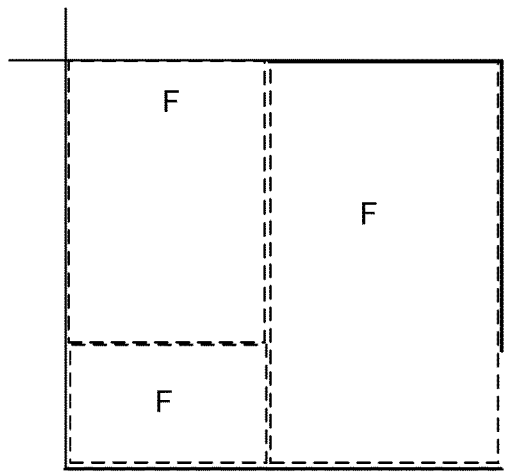

FIG. 2C shows that each segment can be analyzed to distinguish those that are free of obstructions from those that have obstructions (e.g., not structural items). Those segments that have obstructions can be deleted and details filled in from details from adjacent segments (e.g. plane extension and/or intersection). Note further, that the mapping can provide the location of the walls (e.g., inwardly facing surfaces of walls) in the office. Walls can be identified as major vertical surfaces that intersect major horizontal surfaces (e.g., floor and ceiling). As mentioned above, any missing structural areas can be inferred to complete the building plan.

Figure 2D:
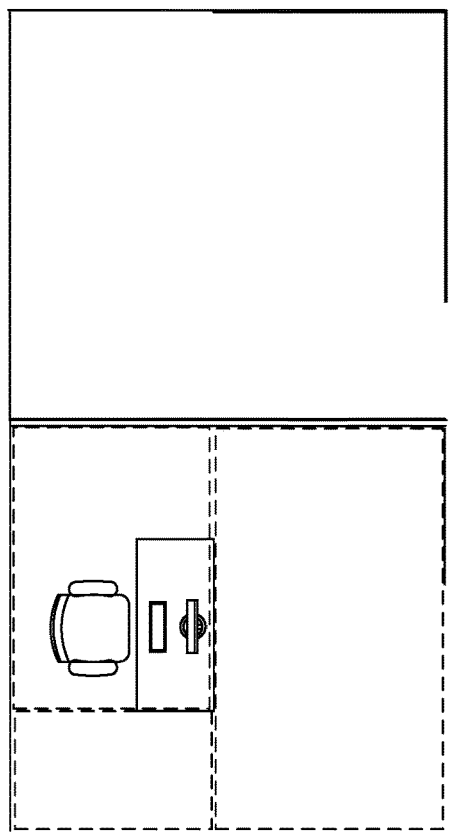

Assume that the user also went into the adjacent office and the camera captured images of that office. FIG. 2D shows how similar operations can be performed in the adjacent office to provide the same details.

Figure 2E:
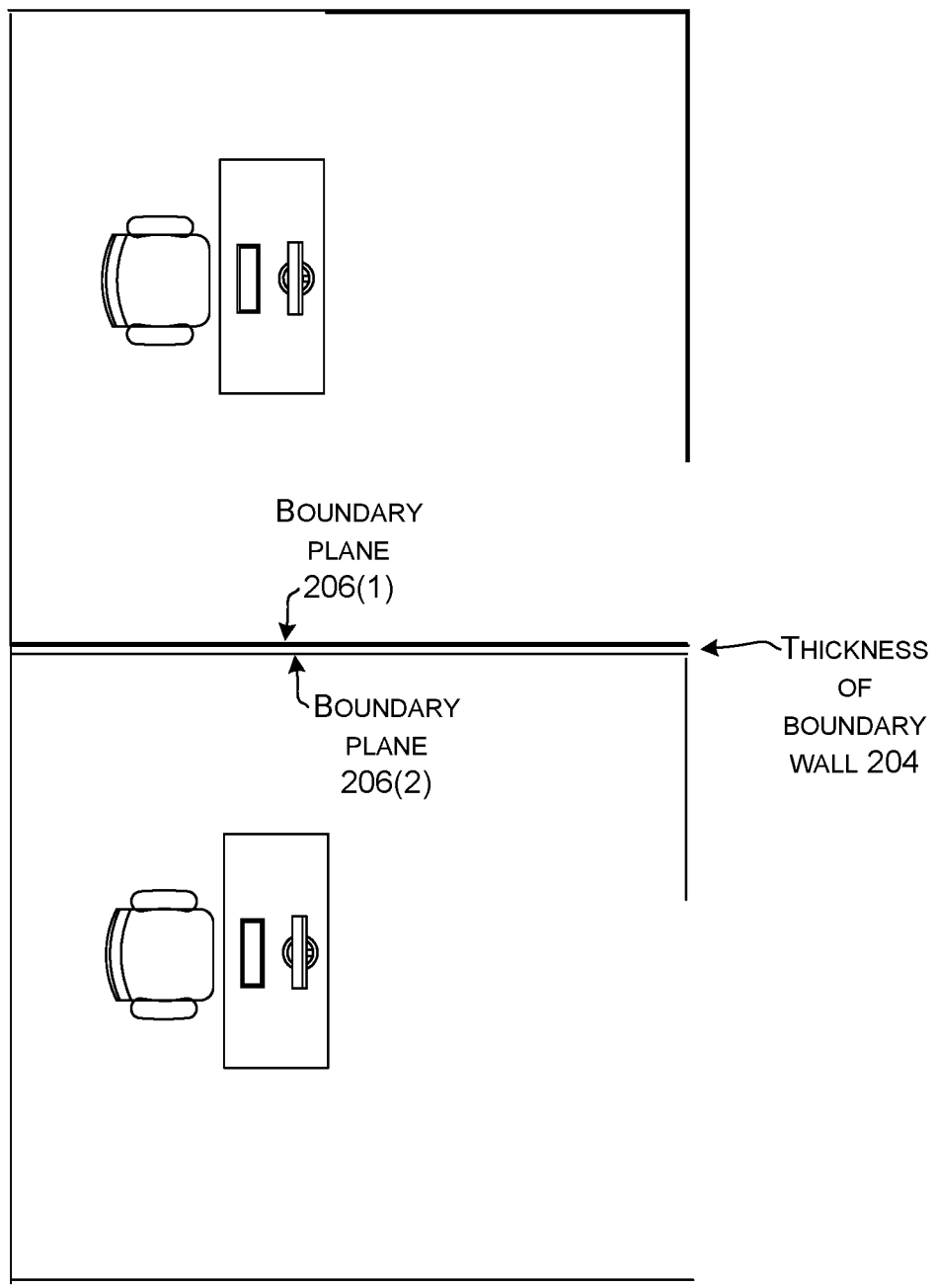

FIG. 2E shows the generated floorplans including thickness of the shared or boundary wall 204 that can be derived as the difference between the wall surfaces or boundary planes 206 in the two adjacent offices. This facet can be applied to other structures in the facility, such as floors and ceilings, among others. Thus, depth images from adjacent regions of the facility can be processed to generate complete plans of the facility even when the depth images do not give complete coverage of all areas and/or despite contents of the facility blocking regions of the structure in the images. FIG. 2E also shows the furnishings (e.g., furniture) added back to the floor plans to create a furniture layout augmented floor plan.

Explained from one perspective, existing applications that deal with building management, updates, and/or planning require accurate, and up-to date floorplans. Examples include space planning, IOT setups, and/or modeling of line-of-sight for surveillance, among others. While some modern buildings have CAD floorplans available there are many that do not, and/or there are day-to-day changes within these buildings that make original plans obsolete.

While there are existing methods that purport to predict/extract floor plan information using vision/tracking sensors, these methods are plagued by line-of-sight issues, and are also not capable of semantic segmentation, discriminating building structure from other objects, such as shelves, dividers, tables, and/or chairs, among others.

One of the problems solved by the inventive aspects is the ability to extract accurate floorplans, quickly, and without requiring scanners to remove furniture/large obstacles. Additionally, the inventive concepts can extend the notion of floorplans to add capabilities of identifying non-structural objects (e.g. furniture) and augmenting floorplans with the location/properties of those objects. Similarly, another problem solved by the inventive aspects is the ability to extract 3D information in the form of blueprints and/or virtual 3D wrappers without moving furniture and/or other obstacles during the imaging process.

FIG. 3 provides example methods or techniques 300 that can accomplish the aspects described above relative to FIGS. 1A-2E.

At 302, the method shows a sensor 304 of camera 102 capturing an image of a scene with accompanying distances between the sensor and points in the scene (e.g., surfaces of objects in the scene). Recall that the earth coordinate system location and orientation of the camera (or a device it is mounted on) and hence the sensor is known. A 3D location algorithm 306 can be employed to determine the earth coordinate system location of the points in the scene (e.g., 3D voxel map 308). (Note that while a single image is illustrated, the process can be repeated for multiple overlapping and/or adjacent images to create a mapping of the scene and hence the facility or environment).

A semantic labelling algorithm 310 can be applied to the image (and/or another image) to identify and label objects in the image and their relative probabilities. This algorithm can produce a semantically-labeled image 312. Some implementations can produce a 2D label map for every frame/image and compute a pixel class probability as well as an instance mask.

In some implementations, the semantic labelling algorithm can be manifest as a neural network, such as a convolutional neural network (CNN). The CNN can receive scene information, such as images, depth information, and/or surface normal information. The CNN can analyze the scene information on a pixel-by-pixel or groups of pixels basis. The CNN can output a class and confidence for each pixel or group of pixels. For instance, the classes can entail structural elements, such as ceiling, wall, floor, window, etc. and non-structural elements, such as chair, desk, table, monitor, couch, etc. Thus, a group of pixels can be associated with a class, such as a chair with 90% confidence and a table with 5% confidence, for example. The highest probability class can be surfaced for each pixel or group of pixels. One such example is shown in FIG. 1F.

The earth coordinate system position map (e.g., 3D voxel map 308) of the scene can be fused at 314 with the semantically-labeled image 312 to produce a 3D voxel representation (e.g., mesh geometry) 316 of the scene. In some cases, the mesh geometry can contain signed distances to the surfaces as well as class and instance data for objects associated with the surfaces.

In some scenarios there are multiple overlapping 3D voxel maps and multiple corresponding semantic labels. Any individual 3D voxel maps may be noisy and have low confidence of the earth coordinate location of individual voxels. Similarly, confidence in individual classes associated with individual pixels in an individual semantically labeled image may be low. However, when combined, confidence about an individual voxel and associated labels grows. For instance, the earth coordinate of an individual voxel may be taken as the average of the earth coordinates for all of the overlapping 3D voxel maps. This can produce a much higher confidence than any 3D voxel map in isolation. Similarly, the semantic label for the pixels associated with that 3D voxel can be the class which surfaces the most times in the corresponding pixels, for example.

From a macro-perspective, the fusion can recreate a mesh geometry of the scene from voxel information of overlapping images. From a micro-perspective, the confidence of the absolute location of individual voxels associated with the mesh geometry and the semantic tags for those voxels can increase by aggregating information about the voxel and its semantic label from multiple instances. For instance, if ten 3D voxel maps are available that relate to a given voxel and nine of the 3D voxel maps indicate the location as xyz and the tenth indicates the location as $x_1y_1z_1$, the confidence that the location is xyz can be higher than can be achieved with any of the 3D voxel maps analyzed alone. Similarly, if semantic labels from nine images indicate that a group of pixels relate to a chair and the semantic label from one image indicates that the group of pixels relate to a desk, the confidence that the object is a chair can be higher than by analyzing any image in isolation. Thus, the scene can be represented as a mesh geometry from multiple images and/or 3D voxel maps and confidence about specific aspects of the mesh geometry can be increased by analyzing overlapping images and/or 3D voxel maps.

Information related to individual locations and/or classes may be tracked in various ways. In some implementations, this information can be binned in histograms. Some of these implementations may conserve resources by eliminating bins that fall below a threshold. For instance, a group of pixels may be labelled in 20 different images, for example. If the first ten images that are analyzed identify the group of pixels as either a table or a desk, those bins may be maintained and the other bins may be discarded to conserve processing and/or storage resources.

The technique can then attempt to identify planes in the mesh geometry at 318. Plane identification can be performed in various ways. Example 3D and 2D techniques are described below. These techniques can share many similarities and trade-off performance/simplicity for accuracy.

One example 3D approach to plane identification can perform a semantic planarization of the scene. This semantic planarization can be defined as a decomposition of mesh geometry into planar regions 320 (most vertices lie within +/−a threshold from a plane equation) that are bounded by semantic class. The last constraint can perform segmentation of co-planar structures such as doors/windows/whiteboards on walls, which may not be properly split without semantic constraints.

Some implementations can identify planes by selecting seed points for potential planes. A seed point can be a point that is a candidate to be in a plane. The process can extend from the seed point to its neighboring points based upon various parameters, such as intensity, texture, and/or color. Stated another way, the seed point can have specific parameter values. The neighbors that have similar parameter values can be judged to lie in the plane and are added to the plane. For instance, the parameter values can be similar if they are within a threshold range of the parameter values of the seed point. The plane keeps growing as long as there are additional neighbor points that lie in the plane. This process can be repeated for seed points in every potential plane of the mesh geometry.

Some of these implementations can employ histograms that include bins of parameter values. The neighboring points that are in the same bin as the seed point (and/or an adjacent bin for example) may be added to the plane or retained for further analysis. Neighboring points having other histogram values may be discarded from further analysis to save resources. For instance, a histogram bin of the seed point value and an adjacent bin on each side (e.g., one higher and one lower) may be maintained, while all other values are discarded.

For structural floorplan generation, the planes can then be filtered by class at 322, specifically all planes not part of the core building structure (e.g., wall/floor/ceiling) can be excluded. In the 2D representation at 324, the planes are represented as arrows. The planes are labeled as structural (S) or non-structural (NS). The space (e.g., office)

can be subdivided into subunits or cells based upon intersection of planes. Stated another way, in representation 324 each rectangle formed by intersecting arrows could be treated as a cell.

In some cases, plane to plane intersection analysis (e.g., whether each pair of planes intersect) can cause cumulative errors. This facet can be addressed with various techniques, such as arbitrary-position arithmetic, which can reduce the errors.

Segmentation can be performed on individual cells to identify missing structural information. One such example can be a shelf covering a wall. The shelf would likely leave a hole in the core structure information. To solve this problem some implementations can obtain the missing information by inference 326 (e.g., inferring the missing values). In representation 328, missing wall values can be inferred from existing structural planes and their intersection. In some cases, inference can be achieved by taking all the planes and partitioning space with them into polyhedrons, such as by using a BSP (binary space partition) structure. Then an algorithm, such as a graph cut can be used to determine which of these partitions are/are not part of the space, inferring the un-observed region.

The inferred areas of the convex hull (e.g., the polyhedrons) can inherit the class of the planes that generated them, e.g. the area under a desk would continue to be floor, the area behind a shelf continues to be wall. In some cases, a BSP algorithm can recursively partition a space in half each time with a cutting plane. In some configurations, this implies that at each (recursive) BSP split operation, the two half spaces resulting from the split are themselves convex (assuming that the initial space is bounded by a convex hull.)

An alternative solution to the proposed methods is to assume that floor plans are constrained to two dimensions. In this case, some implementations can convert plane fitting to line fitting by projecting the points onto the floor plane and finding line fits through them. Extrusion of the convex hull applies just as above but is now performed in 2D.

Given that these implementations can determine the semantic class of nonstructural objects (e.g. desks, chairs, tables, and/or shelves, among others) an extension offered in some implementations is to augment basic floor plans with furniture layout as indicated at 330. For instance, this augmentation can produce a furniture layout augmented floor plan 332, among others. One such example is illustrated relative to FIG. 2E.

Some implementations can achieve augmentation by placing a bounding box (2D) (or bounding volume from a 3D perspective) around the non-structural objects as the pixels/voxels are 'removed' for purposes of identifying the structural planes and completing missing regions. The pixels/voxels associated the bounding box can be restored to add the nonstructural objects, such as the furniture to the structure with the corresponding labels. In some cases, instance segmentation of labeled furniture data allows for model fitting that can predict the location and additionally orientation or other properties of furniture. This can then be fed back to the floor plan generator to mark locations/positions of furniture within the room.

As introduced relative to FIGS. 1L and 1M above and revisited above relative to inference at 326, some implementations can complete missing information about a facility by inferring this information from extension of available information. This completion can be referred to as an aspect of creating the intelligent watertight wrapper or manifold. The term intelligent watertight wrapper or manifold conveys that information about the facility, such as in the form of building plans, is complete (e.g., does not have missing information, such as missing regions in the walls or floors). At a high level, some implementations can build an intelligent watertight wrapper on top of the facility but builds it in such a way as to infer/and predict structure. While some of the implementations can produce high value results when paired with a semantic inference engine, scene understanding is not necessary to get some of the benefits. (A semantic inference engine can apply logical rules to a knowledge base to deduce new information). The following explanation focuses first on a purely geometric incarnation of the intelligent watertight wrapper and then the intelligent watertight wrapper can be augmented with the use of semantic inference.

Traditional augmented reality and/or virtual reality devices can map their environments (e.g., facilities) by various means, but in all but rare cases these representations are incomplete and not readily usable for use by other applications, such as physics simulation applications. This incompleteness of environments causes huge problems. For instance, recall the scenario introduced relative to FIG. 1L of simulating the ball rolling on the floor and going under the desk. Since that area is most likely not visible, one of two things can happen: the ball will fall through the floor and start falling for infinity, or it can bounce off of an invisible barrier as soon as it touches unscanned space. Existing techniques could try to align CAD models or generate extremely thorough scans and re-register them with devices, but these are not practical solutions for most applications.

In contrast, the present concepts solve this technical problem and provide the ability to generate watertight and accurate models of environments. This technical solution opens an avenue for more realistic and accurate physical simulation, among other uses. An example solution utilizing these techniques was introduced relative to FIG. 1M. Other examples of the types of problems that such an improvement would enable include physics solutions, spatial audio computation solutions, and/or navigation/path planning. Most physics engines assume that the world is watertight otherwise objects can fall through the floor and/or exhibit other bizarre behaviors. Spatial audio computation can create a simulation of sound bouncing off of various objects. If the spatial audio computation model does not have a watertight representation rays are not guaranteed to bounce off of anything.

Navigation/path planning is only as good as the reference map of the environment. While 2D navigation may simply be impeded by holes and missing data, 3D navigation (flying objects) can generate implausible paths for navigation exiting through holes in the surface mesh (e.g., in the manifold), for example.

Figure 4:
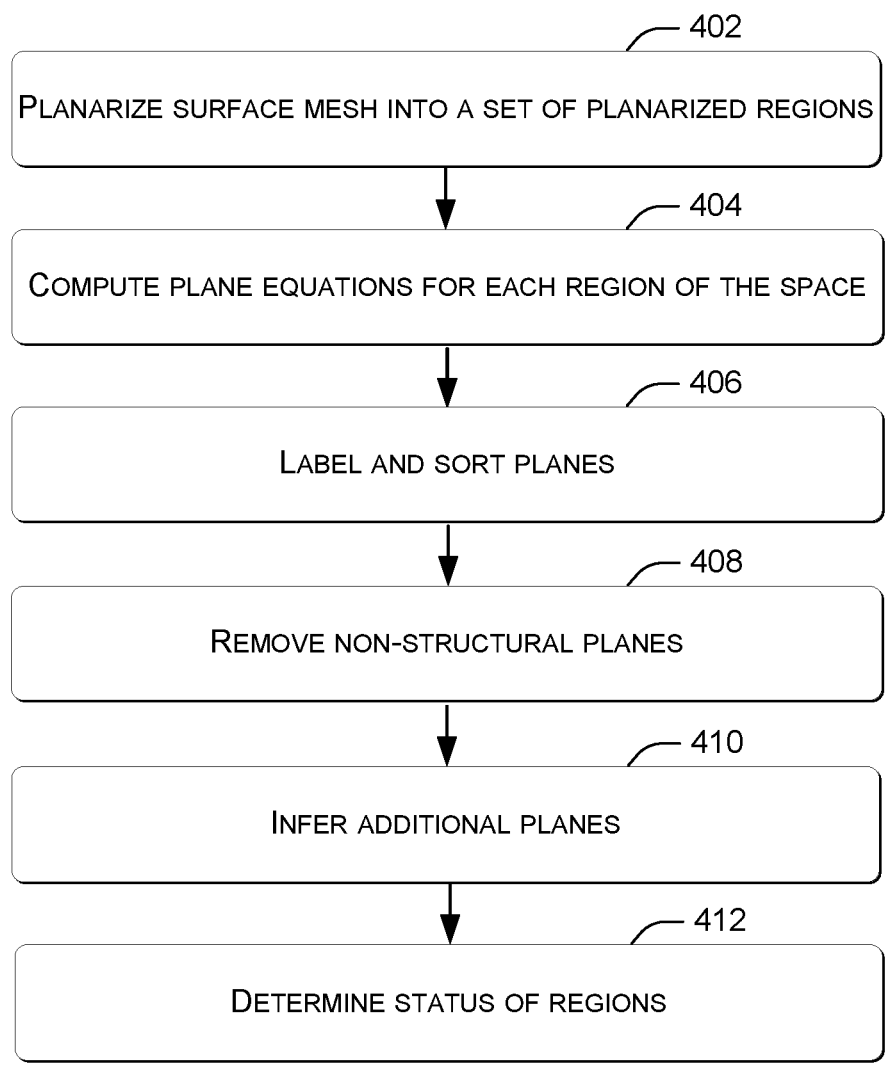
FIGS. 4 and 5 show example flowcharts for accomplishing depth image scene processing concepts in accordance with some implementations.

FIG. 4 offers details of another example method 400. In this case, at block 402 the surface mesh can be planarized into a set of planar regions. There are various methods to do this and some of these are described above. One goal is to produce an accurate but planar representation of the space.

At block 404, plane equations for each region (e.g., cell) of the space can be computed. For instance, a binary space partitioning structure can be utilized to divide the regions.

At block 406, planes can be labeled and sorted. For instance, heuristics can be employed to accomplish labeling and/or sorting. In one such case, heuristics can be employed that specifically assume that the largest top and bottom (e.g., horizontal) planes are assumed to be floors and ceilings, respectively and large vertical planes that intersect the floor and ceiling are assumed to be walls.

At block 408, planes that are not structural (e.g., all planes except wall/floor/ceiling planes) can be removed from further processing.

At block 410, additional planes can be inferred. For instance, the additional planes can be inferred via the heuristics introduced above. For example, additional planes related to symmetry, 90-degree corners, and/or assumptions of wall thickness, among others, can be identified. In many cases, these additional inferred planes enable the algorithm to extract an accurate wrapper. For example, thin structures, such as door frames may not be readily and/or completely detected in the blocks above. The ability to infer some or all of the planes of a thin door enables the wrapper to accurately contain the door opening.

At block 412, a status of regions (e.g., cells) can be determined. The status can relate to whether the regions are inside or outside the scene (e.g., the space). For instance, an algorithm such as a graph cut (or any other geometric algorithm that builds watertight meshes, e.g., screened Poisson) can be used to determine if cells comprised in the partition are inside or outside of the space via a cost function that uses observations and other properties to determine internal/external data.

The cells now represent a compact watertight manifold around the room that can be utilized for various purposes. For instance, as mentioned above, physics exercises can now be performed on the space.

While this describes the general solutions, quality can be vital for correct representations. Afterall, a naïve implementation of using screened Poisson reconstruction on a surface mesh may produce nearly the same effect as the "invisible barrier" blocking the ball under the table.

One potentially effective way to discern whether planes should/should not belong to the manifold as well as to produce correct inferred primitives (back sides of walls, for example) is to use an inference engine to predict the class (e.g., structural class versus non-structural class) of the planar regions themselves.

Some implementations can utilize machine learning to make predictions about objects in the scene. For instance, some implementations can use a deep neural network (DNN) that is specifically trained to consider depth and visible light images to perform predictions. Some implementations can predict the label for each voxel, and planes are classified using a voting mechanism, but other methods for classifying planes can exist.

By filtering out planes by class (e.g., structural/non-structural) these implementations can easily solve problems like the ball under the table example of FIGS. 1L and 1M, since table data is not included in the manifold solver.

Physical simulations are not limited to the manifold geometry. In many cases it may be ideal to merge the two representations (mesh and manifold) by removing all mesh data that is near the manifold geometry (walls/floors) but keeping mesh data that is away from it (chairs/tables). Thus, some implementations can perform physical simulation on both the high detail data and the structural watertight model.

Some implementations can provide additional detail through displacement maps. If physics simulation would additionally benefit from the specific details of reconstruction around the manifold (it wants to know the rough texture of a wall for example) it may not be enough to merge the two representations as parts of the mesh may be "inside" walls. Instead some implementations can include an extension to the manifold in the form of a displacement map. This representation can augment the planar structure by quantizing it and encoding additional depth values. This can encode the true texture of the manifold surface in an efficient way and produce accurate simulation.

Figure 5:
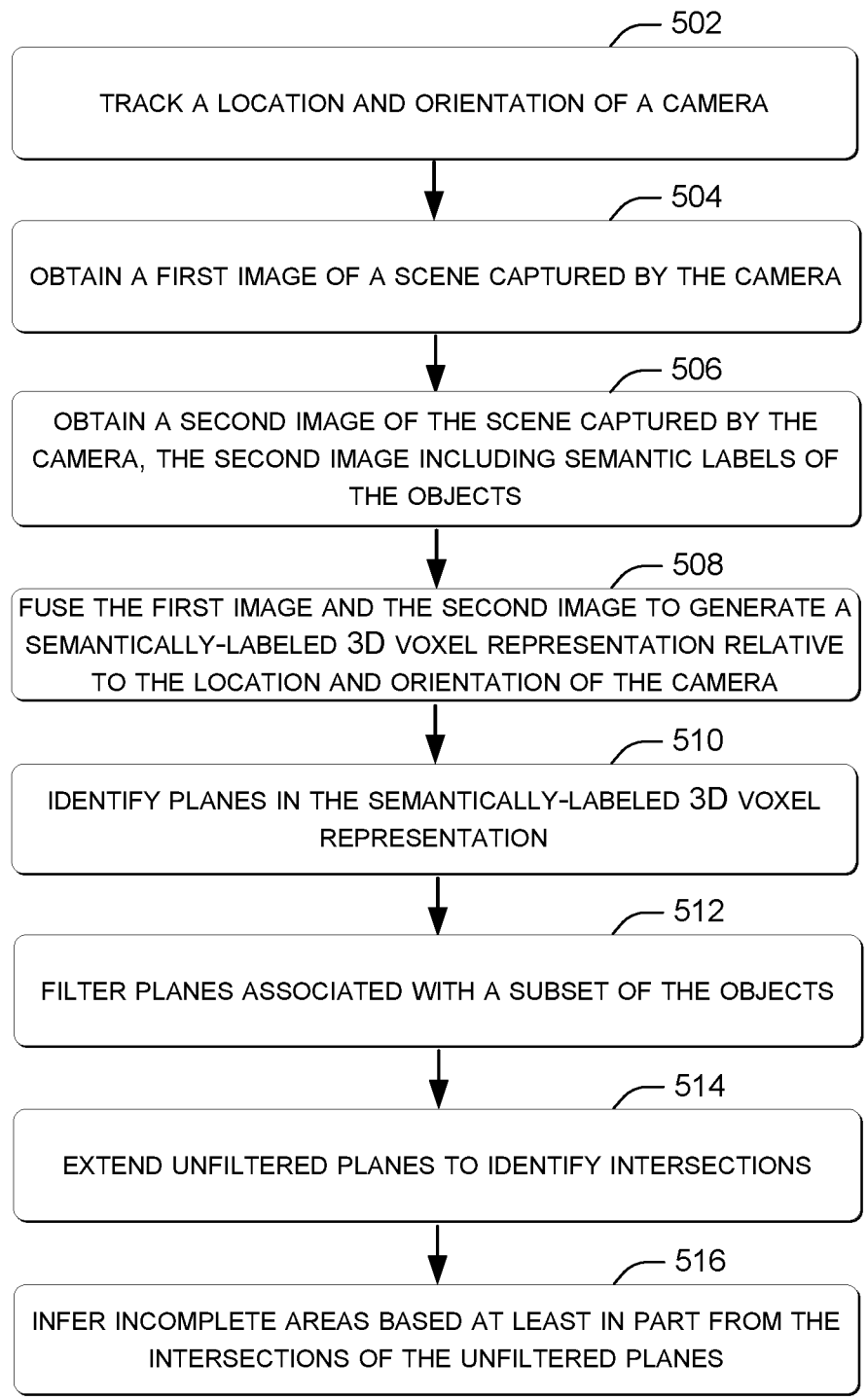

FIG. 5 shows another example method or technique 500. Block 502 can track a location and orientation of a camera. The camera may be a component of another device, such as head mounted augmented reality device, a robot, a vehicle, etc. or a free-standing device.

Block 504 can obtain a first image of a scene captured by the camera. The first image can be a depth image that includes distances of objects in the scene from the camera. Alternatively, depth information can be obtained relative to the image utilizing various techniques. For instance, the first image could be a pair of 2D images and depth information could be derived by analyzing the pair of 2D images.

Block 506 can receive a second image of the scene captured by the camera. The second image can include semantic labels of the objects. The second image may be derived from the first image or may be a different image.

Block 508 can fuse the first image and the second image to generate a semantically-labeled 3D voxel representation relative to the location and orientation of the camera.

Block 510 can identify planes in the semantically-labeled 3D voxel representation.

Block 512 can filter planes associated with a subset of the objects.

Block 514 can extend unfiltered planes to identify intersections.

Block 516 can infer incomplete areas based at least in part from the intersections of the unfiltered planes. Inferring the incomplete areas can allow the generation of an accurate and complete intelligent watertight manifold for the scene. While the process is discussed relative to a pair of images, multiple images from different locations and/or orientations may be utilized to generate the intelligent watertight manifold. For instance, a user wearing the camera may walk through the scene, such as rooms of a facility and/or around the exterior of a facility while multiple images are captured by the camera. These images can be stitched together and/or otherwise integrated to generate the intelligent watertight manifold for the whole facility.

Figure 6:
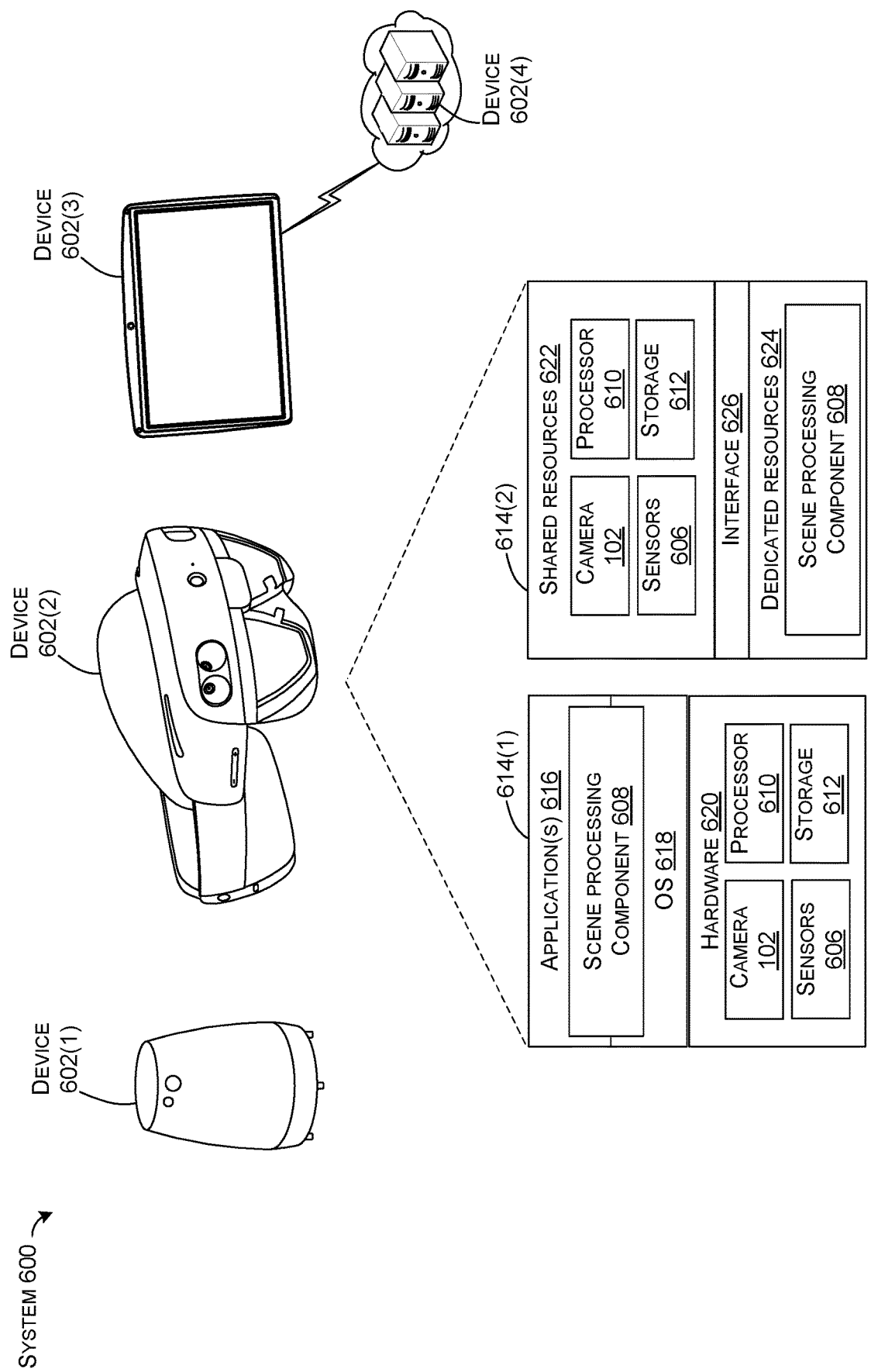
FIG. 6 shows an example system for accomplishing the depth image scene processing concepts.

FIG. 6 shows a system 600 that can accomplish intelligent watertight wrapper concepts. For purposes of explanation, system 600 can include four devices 602(1), 602(2), 602(3), and 602(4). Device 602(1) is manifest as an autonomous robot that is similar to robot 107 of FIG. 1A. Device 602(2) is manifest as a head mounted augmented reality device, similar to augmented reality device 104 of FIG. 1A, and device 602(3) is manifest as a tablet-type device. Devices 602(1)-602(3) can include cameras 102. Any of these devices can be free-standing and/or can communicate with other devices, such as server-type devices 602(4). Individual devices 602 can include camera 102, other sensors 606, a scene processing component 608, a processor 610, and/or storage 612.

FIG. 6 shows two device configurations 614 that can be employed by devices 602. Individual devices 602 can employ either of configurations 614(1) or 614(2), or an alternate configuration. (Due to space constraints on the drawing page, one instance of each device configuration is illustrated rather than illustrating the device configurations relative to each device 602). Briefly, device configuration 614(1) represents an operating system (OS) centric configuration. Device configuration 614(2) represents a system on a chip (SOC) configuration. Device configuration 614(1) is organized into one or more applications 616, operating system 618, and hardware 620. Device configuration 618(2)

is organized into shared resources 622, dedicated resources 624, and an interface 626 therebetween.

In some configurations, each of devices 602 can have an instance of the scene processing component 608. However, the functionalities that can be performed by scene processing component 608 may be the same or they may be different from one another. For instance, in some cases, each device's scene processing component 608 can be robust and provide all of the functionality described above and below (e.g., a device-centric implementation). In other cases, some devices can employ a less robust instance of the scene processing component 608 that relies on some functionality to be performed by another device. For instance, device 602(4) may have more processing resources than device 602(1). In such a configuration, some scene processing component functions may be performed on device 602(4) rather than device 602(1).

The term "device," "computer," or "computing device" as used herein can mean any type of device that has some amount of processing capability and/or storage capability. Processing capability can be provided by one or more processors that can execute data in the form of computer-readable instructions to provide a functionality. Data, such as computer-readable instructions and/or user-related data, can be stored on storage, such as storage that can be internal or external to the device. The storage can include any one or more of volatile or non-volatile memory, hard drives, flash storage devices, and/or optical storage devices (e.g., CDs, DVDs etc.), remote storage (e.g., cloud-based storage), among others. As used herein, the term "computer-readable media" can include signals. In contrast, the term "computer-readable storage media" excludes signals. Computer-readable storage media includes "computer-readable storage devices." Examples of computer-readable storage devices include volatile storage media, such as RAM, and non-volatile storage media, such as hard drives, optical discs, and flash memory, among others.

Examples of devices 602 can include traditional computing devices, such as personal computers, desktop computers, servers, notebook computers, vehicles, smart cameras, surveillance devices/systems, safety devices/systems, wearable smart devices, appliances, and other developing and/or yet to be developed device types, etc.

As mentioned above, device configuration 614(2) can be thought of as a system on a chip (SOC) type design. In such a case, functionality provided by the device can be integrated on a single SOC or multiple coupled SOCs. One or more processors 610 can be configured to coordinate with shared resources 622, such as memory/storage 612, etc., and/or one or more dedicated resources 624, such as hardware blocks configured to perform certain specific functionality. Thus, the term "processor" as used herein can also refer to central processing units (CPUs), graphical processing units (GPUs), field programmable gate arrays (FPGAs), controllers, microcontrollers, processor cores, and/or other types of processing devices.

Generally, any of the functions described herein can be implemented using software, firmware, hardware (e.g., fixed-logic circuitry), or a combination of these implementations. The term "component" as used herein generally represents software, firmware, hardware, whole devices or networks, or a combination thereof. In the case of a software implementation, for instance, these may represent program code that performs specified tasks when executed on a processor (e.g., CPU or CPUs). The program code can be stored in one or more computer-readable memory devices, such as computer-readable storage media. The features and techniques of the component are platform-independent, meaning that they may be implemented on a variety of commercial computing platforms having a variety of processing configurations.

Various examples are described above. Additional examples are described below. One example includes a method comprising tracking a location and orientation of a camera and obtaining a first image of a scene captured by the camera. The first image can include distances of objects in the scene from the camera. The method can also obtain a second image of the scene captured by the camera. The second image can include semantic labels of the objects. The method can fuse the first image and the second image to generate a semantically-labeled 3D voxel representation relative to the location and orientation of the camera, identify planes in the semantically-labeled 3D voxel representation, filter planes associated with a subset of the objects, extend unfiltered planes to identify intersections and inferring incomplete areas based at least in part from the intersections of the unfiltered planes.

Another example can include any of the above and/or below examples where the inferred incomplete areas are applied to the semantically-labeled 3D voxel representation and/or to a 3D mesh of the scene.

Another example can include any of the above and/or below examples where the extending unfiltered planes further comprises subdividing the semantically-labeled 3D voxel representation into cells based at least in part upon the intersections.

Another example can include any of the above and/or below examples that labels individual cells into a binary classification.

Another example can include any of the above and/or below examples where the binary classification is free cells or obstacle cells.

Another example can include any of the above and/or below examples that extracts boundary planes of the scene based at least in part upon adjacent free cells and obstacle cells.

Another example can include any of the above and/or below examples that generates floor plans at least in part from the boundary planes.

Another example can include any of the above and/or below examples where the inferring incomplete areas of the semantically-labeled 3D voxel representation causes the floor plans to be watertight.

Another example can include any of the above and/or below examples where the filtering planes associated with a subset of the objects comprises filtering planes that are not associated with specific semantic terms.

Another example can include any of the above and/or below examples where the specific semantic terms comprise floor, wall, and ceiling.

Another example can include any of the above and/or below examples where the tracking a location comprises tracking the location relative to an earth coordinate system.

Another example can include any of the above and/or below examples where the earth coordinate system comprises global navigation satellite system coordinates.

Another example can include any of the above and/or below examples that utilize the inferred incomplete areas to complete an intelligent watertight manifold representing the scene.

Another example includes a system comprising a camera configured to capture a depth map of a scene, and a processor configured to receive a semantically-labeled 3D voxel representation of a scene, identify planes in the semantically-labeled 3D voxel representation, filter planes which do not contribute to a manifold that represents the scene, extend unfiltered planes to identify intersections, and infer incomplete areas of the manifold based at least in part from the intersections of the unfiltered planes.

Another example can include any of the above and/or below examples where the processor is configured to utilize the inferred incomplete areas to ensure that the manifold is an intelligent watertight manifold.

Another example can include any of the above and/or below examples where the processor is configured to execute the identifying planes in a manner that characterizes individual planes as contributing to the manifold or not contributing to the manifold.

Another example can include any of the above and/or below examples where the processor is configured to receive multiple semantically-labeled 3D voxel representations of the scene from different locations and/or orientations and to generate the manifold from the multiple semantically-labeled 3D voxel representations.

Another example can include any of the above and/or below examples where the processor and the camera are manifest on an augmented reality device.

Another example can include any of the above and/or below examples where the augmented reality device is manifest as an augmented reality headset.

Another example can include any of the above and/or below examples where the processor is located on a device that is physically separate from the camera.

Another example includes a computer-readable storage medium storing instructions which, when executed by a processing device, cause the processing device to perform acts comprising identifying planes in a semantically-labeled 3D voxel representation of a scene, inferring missing information by extending individual planes associated with structural elements of the scene, and generating a watertight manifold representation of the scene at least in part from the inferred missing information.

CONCLUSION

To summarize some of the aspects described above, some implementations can leverage capabilities of tracking a camera in space, using head tracking, the ability to infer depth, via time of flight, structured light, active stereo and/or feature matching techniques. Some implementations can segment image objects both by class and instance. These facets can be extended for various purposes, such as to support floor plans using the ability to segment object instances (unique occurrences of an object).

Given a partial reconstruction of an environment, some implementations can compute a semantic and instance segmentation of the space (e.g., portion of the environment). There are various methods/techniques to do this. Some described techniques can produce a 2D label map for every frame/image and can compute the pixel class probability as well as an instance mask. These values can be fused with the reconstruction algorithm generating a 3D voxel representation in the environment that contains signed distances to the surface as well as class and instance data. While the semantic segmentation can represent a wide range of classes, for floor plan generation some implementations can support core architectural features of walls/floors/ceilings, for instance. The extension of custom objects added to floor plans e.g. doors/windows/pipes, among others, can be added on demand depending on the scenario addressed.

The order in which the disclosed methods are described is not intended to be construed as a limitation, and any number of the described blocks can be combined in any order to implement the method, or an alternate method. Furthermore, the methods can be implemented in any suitable hardware, software, firmware, or combination thereof, such that a computing device can implement the method. In one case, the methods are stored on one or more computer-readable storage media as a set of instructions such that execution by a processor of a computing device causes the computing device to perform the method.

Although techniques, methods, devices, systems, etc., pertaining to scene analysis are described in language specific to structural features and/or methodological acts, it is to be understood that the subject matter defined in the appended claims is not necessarily limited to the specific features or acts described. Rather, the specific features and acts are disclosed as example forms of implementing the claimed methods, devices, systems, etc.

The invention claimed is:

1. A method, comprising:
   obtaining a first image of a scene captured by a camera, the first image including distances of objects in the scene from the camera and the first image including incomplete areas of the scene;
   obtaining a second image of the scene captured by the camera, the second image including semantic labels of the objects;
   fusing the first image and the second image to generate a semantically-labeled 3D voxel representation relative to a location and orientation of the camera;
   identifying planes in the semantically-labeled 3D voxel representation based on the semantic labels;
   filtering planes associated with a subset of the objects based on the semantic labels;
   extending unfiltered planes to identify intersections; and,
   inferring incomplete areas of the semantically-labeled 3D voxel representation at least in part from the intersections of the unfiltered planes.

2. The method of claim 1, wherein the extending unfiltered planes further comprises subdividing the semantically-labeled 3D voxel representation into cells based at least in part upon the intersections.

3. The method of claim 2, further comprising labeling individual cells into a classification that includes free cells or obstacle cells, the free cells being free of obstruction objects, the obstacle cells including non-structural objects.

4. The method of claim 3, further comprising extracting boundary planes of the scene based at least in part upon adjacent free cells and obstacle cells.

5. The method of claim 4, further comprising generating floor plans at least in part from the boundary planes.

6. The method of claim 5, wherein the inferring incomplete areas of the semantically-labeled 3D voxel representation causes the floor plans to be watertight.

7. The method of claim 1, wherein the filtering planes associated with a subset of the objects comprises filtering planes that are not associated with specific semantic terms.

8. The method of claim 7, wherein the specific semantic terms comprise floor, wall, and ceiling.

9. The method of claim 1, further comprising tracking a location of the camera relative to an earth coordinate system.

10. The method of claim 9, wherein the earth coordinate system comprises global navigation satellite system coordinates.

11. The method of claim 1, further comprising utilizing the inferred incomplete areas to complete an intelligent watertight manifold representing the scene.

12. The method of claim 1, wherein the distances of objects in the first image are relative distances in relation to the camera, the method further comprising converting the relative distances to absolute locations based on a location and an orientation of the camera.

13. A system, comprising:
a camera configured to capture a depth map of a scene; and,
a processor configured to:
receive a semantically-labeled 3D voxel representation of a scene, the semantically-labeled 3D voxel representation including semantic labels of objects in the scene;
identify planes in the semantically-labeled 3D voxel representation based on the semantic labels;
filter planes which do not contribute to a manifold that represents the scene based on the semantic labels;
extend unfiltered planes to identify intersections; and,
infer incomplete areas of the manifold based at least in part from the intersections of the unfiltered planes.

14. The system of claim 13, wherein the processor is configured to utilize the inferred incomplete areas to ensure that the manifold is an intelligent watertight manifold.

15. The system of claim 13, wherein the processor is configured to execute the identified planes in a manner that characterizes individual planes as contributing to the manifold or not contributing to the manifold.

16. The system of claim 13, wherein the processor is configured to receive multiple semantically-labeled 3D voxel representations of the scene from different locations and/or orientations and to generate the manifold from the multiple semantically-labeled 3D voxel representations.

17. The system of claim 13, wherein the processor and the camera are manifest on an augmented reality device.

18. The system of claim 17, wherein the augmented reality device is manifest as an augmented reality headset.

19. The system of claim 13, wherein the processor is located on a device that is physically separate from the camera.

20. A computer-readable storage medium storing instructions which, when executed by a processing device, cause the processing device to perform acts comprising:
identifying planes in a semantically-labeled 3D voxel representation of a scene based on semantic labels in the semantically-labeled 3D voxel representation;
inferring missing information by extending individual planes associated with structural elements of the scene; and,
generating a watertight manifold representation of the scene at least in part from the inferred missing information.

* * * * *